(12) United States Patent
Deng et al.

(10) Patent No.: US 10,873,755 B2
(45) Date of Patent: Dec. 22, 2020

(54) METHOD AND SYSTEM OF MOTION ESTIMATION WITH NEIGHBOR BLOCK PATTERN FOR VIDEO CODING

(71) Applicant: Intel Corporation, Santa Clara, CA (US)

(72) Inventors: Zhipin Deng, Beijing (CN); Iole Moccagatta, San Jose, CA (US); Lidong Xu, Beijing (CN); Wenhao Zhang, Beijing (CN); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 16/300,290

(22) PCT Filed: Jun. 9, 2016

(86) PCT No.: PCT/CN2016/085385
§ 371 (c)(1),
(2) Date: Nov. 9, 2018

(87) PCT Pub. No.: WO2017/210915
PCT Pub. Date: Dec. 14, 2017

(65) Prior Publication Data
US 2019/0132605 A1    May 2, 2019

(51) Int. Cl.
| | | |
|---|---|---|
| G06T 7/238 | (2017.01) |
| H04N 19/51 | (2014.01) |
| H04N 19/57 | (2014.01) |
| H04N 19/176 | (2014.01) |
| H04N 19/593 | (2014.01) |

(52) U.S. Cl.
CPC .............. *H04N 19/51* (2014.11); *G06T 7/238* (2017.01); *H04N 19/176* (2014.11); *H04N 19/57* (2014.11); *H04N 19/593* (2014.11); *G06T 2207/10016* (2013.01); *G06T 2207/20021* (2013.01)

(58) Field of Classification Search
CPC ...... H04N 19/51; H04N 19/176; H04N 19/57; H04N 19/593; G06T 7/238; G06T 2207/10016; G06T 2207/20021
USPC ....................................................... 348/701
See application file for complete search history.

(56) References Cited

U.S. PATENT DOCUMENTS

| | | | |
|---|---|---|---|
| 7,260,148 B2* | 8/2007 | Sohm ..................... | H04N 19/56 348/416.1 |
| 2011/0013853 A1* | 1/2011 | Chen ..................... | H04N 5/145 382/236 |

(Continued)

FOREIGN PATENT DOCUMENTS

| | | |
|---|---|---|
| CN | 101800893 | 8/2010 |
| CN | 104488272 | 4/2015 |
| KR | 20110111339 | 10/2011 |

OTHER PUBLICATIONS

International Preliminary Report on Patentability for International Patent Application No. PCT/CN16/85385, dated Dec. 20, 2018.

(Continued)

*Primary Examiner* — Michael Lee
(74) *Attorney, Agent, or Firm* — Green, Howard & Mughal LLP.

(57) ABSTRACT

Techniques related to motion estimation with neighbor block pattern for video coding.

25 Claims, 14 Drawing Sheets

(56) References Cited

U.S. PATENT DOCUMENTS

| 2012/0281762 A1* | 11/2012 | Dane | H04N 19/139 |
| | | | 375/240.16 |
| 2014/0146890 A1* | 5/2014 | Chiu | H04N 19/513 |
| | | | 375/240.16 |
| 2015/0181223 A1 | 6/2015 | Canon | |
| 2015/0195558 A1 | 7/2015 | Kim | |
| 2016/0219302 A1* | 7/2016 | Liu | H04N 19/583 |
| 2018/0176596 A1* | 6/2018 | Jeong | H04N 19/176 |

OTHER PUBLICATIONS

International Search Report and Written Opinion for International Patent Application No. PCT/CN2016/085385, dated Feb. 23, 2017.
Ismail, Yasser et al., "Fast Motion Estimation System Using Dynamic Models for H.264/AVC Video Coding", IEEE Transactions on Circuits and Systems for Video Technology, Jan. 31, 2012, No. 1, vol. 22, whole document.
*Pieter3d*, forum.doom9.org/showthread.php?t=168947, Santa Clara, CA (2013).
European Search Report for EP patent application No. 16904367.6, dated Jan. 30, 2020.
Grange, A., "VP9 Bitstream & Decoding Process Specification", Google, Version 0.6, entire document (2016).
Mukherjee, et al., "A Technical Overview of VP9-The Latest Open-Source Video Codec", SMPTE 2013 Annual Technical Conference & Exhibition; Oct. 22, 2013, pp. 1-17.

* cited by examiner

| FIG. | SIZE | mv_ref_blocks[ BLOCK_SIZES ][ MVREF_NEIGHBOURS ][ 2 ] = { |
|---|---|---|
| 2A | 4 x 4 | {{-1, 0}, {0, -1}, {-1, -1}, {-2, 0}, {0, -2}, {-2, -1}, {-1, -2}, {-2, -2}}, |
| 2B | 4 x 8 | {{-1, 0}, {0, -1}, {-1, -1}, {-2, 0}, {0, -2}, {-2, -1}, {-1, -2}, {-2, -2}}, |
| 2C | 8 x 4 | {{-1, 0}, {0, -1}, {-1, -1}, {-2, 0}, {0, -2}, {-2, -1}, {-1, -2}, {-2, -2}}, |
| 2D | 8 x 8 | {{-1, 0}, {0, -1}, {-1, -1}, {-2, 0}, {0, -2}, {-2, -1}, {-1, -2}, {-2, -2}}, |
| 2E | 8 x 16 | {{0, -1}, {-1, 0}, {1, -1}, {-1, -1}, {0, -2}, {-2, 0}, {-2, -1}, {-1, -2}}, |
| 2F | 16 x 8 | {{-1, 0}, {0, -1}, {-1, 1}, {-1, -1}, {-2, 0}, {0, -2}, {-1, -2}, {-2, -1}}, |
| 2G | 16 x 16 | {{-1, 0}, {0, -1}, {-1, 1}, {1, -1}, {-1, -1}, {-3, 0}, {0, -3}, {-3, -3}}, |
| 2H | 16 x 32 | {{0, -1}, {-1, 0}, {2, -1}, {-1, -1}, {-1, 1}, {0, -3}, {-3, 0}, {-3, -3}}, |
| 2I | 32 x 16 | {{-1, 0}, {0, -1}, {-1, 2}, {-1, -1}, {1, -1}, {-3, 0}, {0, -3}, {-3, -3}}, |
| 2J | 32 x 32 | {{-1, 1}, {1, -1}, {-1, 2}, {2, -1}, {-1, -1}, {-3, 0}, {0, -3}, {-3, -3}}, |
| 2K | 32 x 64 | {{0, -1}, {-1, 0}, {4, -1}, {-1, 2}, {-1, -1}, {0, -3}, {-3, 0}, {2, -1}}, |
| 2L | 64 x 32 | {{-1, 0}, {0, -1}, {-1, 4}, {2, -1}, {-1, -1}, {-3, 0}, {0, -3}, {-1, 2}}, |
| 2M | 64 x 64 | {{-1, 3}, {3, -1}, {-1, 4}, {4, -1}, {-1, -1}, {-1, 0}, {0, -1}, {-1, 6}} |

201  202  blk4x4

204  blk4x8

206  blk8x4

208  blk8x8

210  blk8x16

212  blk16x8

214  blk16x16

216  blk16x32

218  blk32x16

220  blk32x32

222  blk32x64

224  blk64x32

226  blk64x64

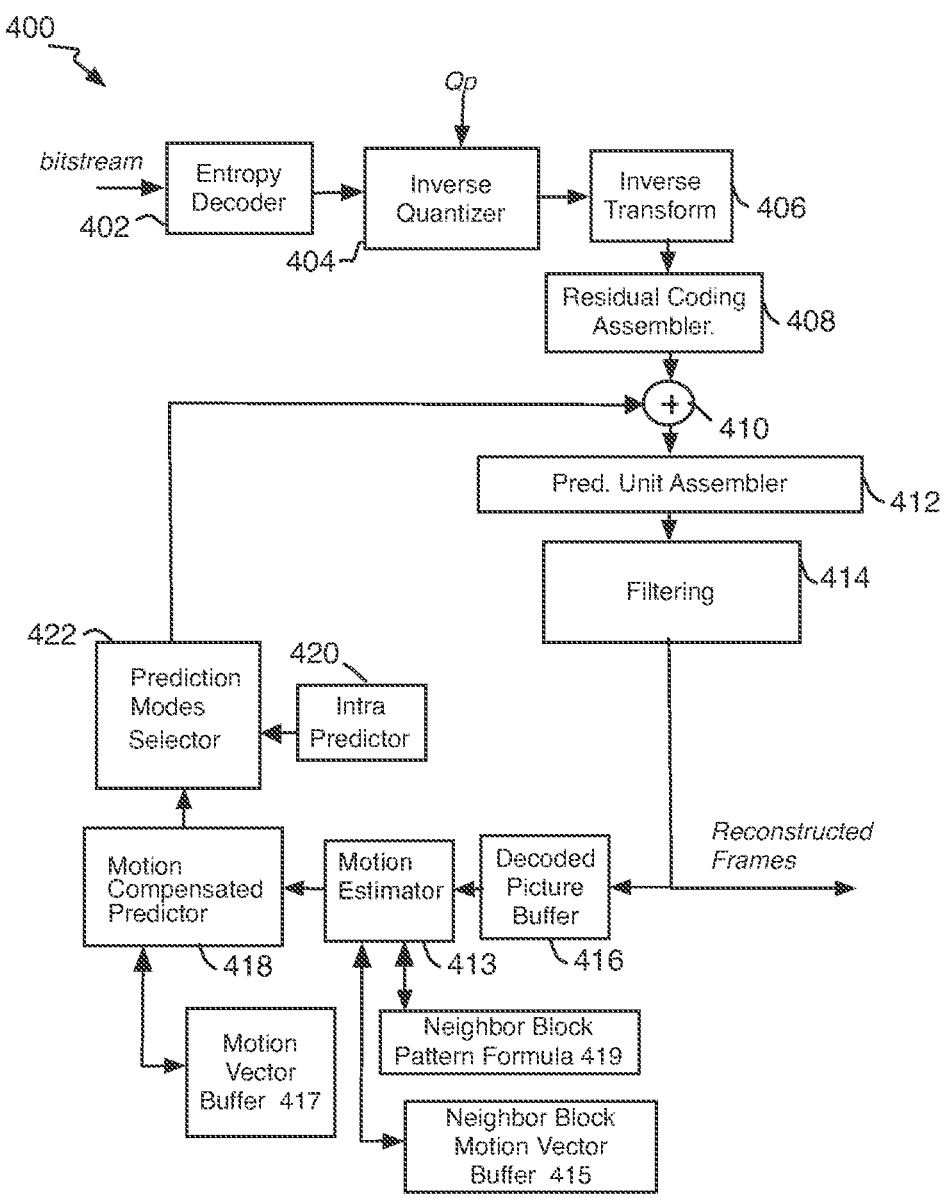

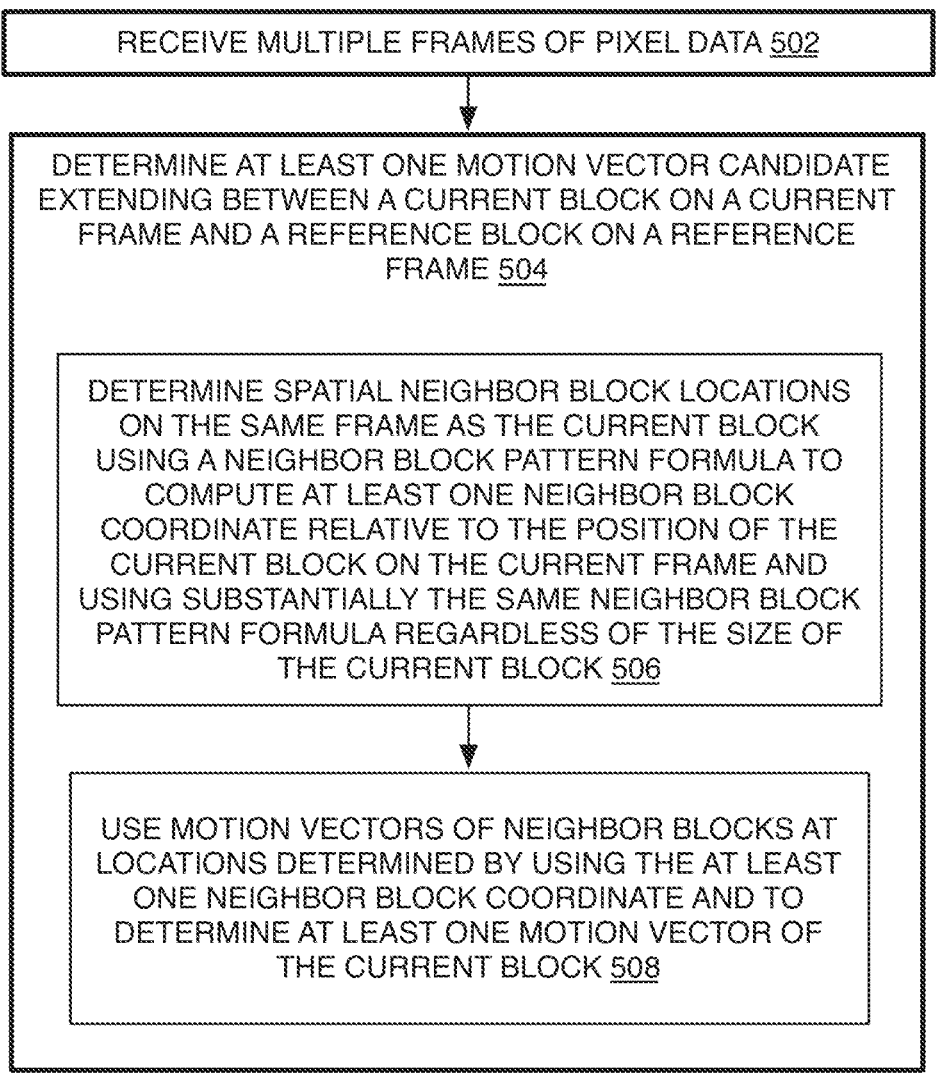

```
36  #if XXXX_SIMPLIFIED_MV_NEIGHBOR
37      POSITION mv_ref_search[MVREF_NEIGHBOURS];
38      const int num_8x8_blocks_wide = bw >> 3;
39      const int num_8x8_blocks_high = bh >> 3;
40      mv_ref_search[0].row = num_8x8_blocks_high - 1;
41      mv_ref_search[0].col = -1;
42      mv_ref_search[1].row = -1;
43      mv_ref_search[1].col = num_8x8_blocks_wide - 1;
44      mv_ref_search[2].row = -1;
45      mv_ref_search[2].col = (num_8x8_blocks_wide - 1) >> 1;
46      mv_ref_search[3].row = (num_8x8_blocks_high - 1) >> 1;
47      mv_ref_search[3].col = -1;
48      mv_ref_search[4].row = -1;
49      mv_ref_search[4].col = -1;
50      mv_ref_search[5].row = -1;
51      mv_ref_search[5].col = num_8x8_blocks_wide;
52      mv_ref_search[6].row = num_8x8_blocks_high;
53      mv_ref_search[6].col = -1;
54      mv_ref_search[7].row = -1;
55      mv_ref_search[7].col = -3;
56      mv_ref_search[8].row = num_8x8_blocks_high - 1;
57      mv_ref_search[8].col = -3;
58  #endif
```

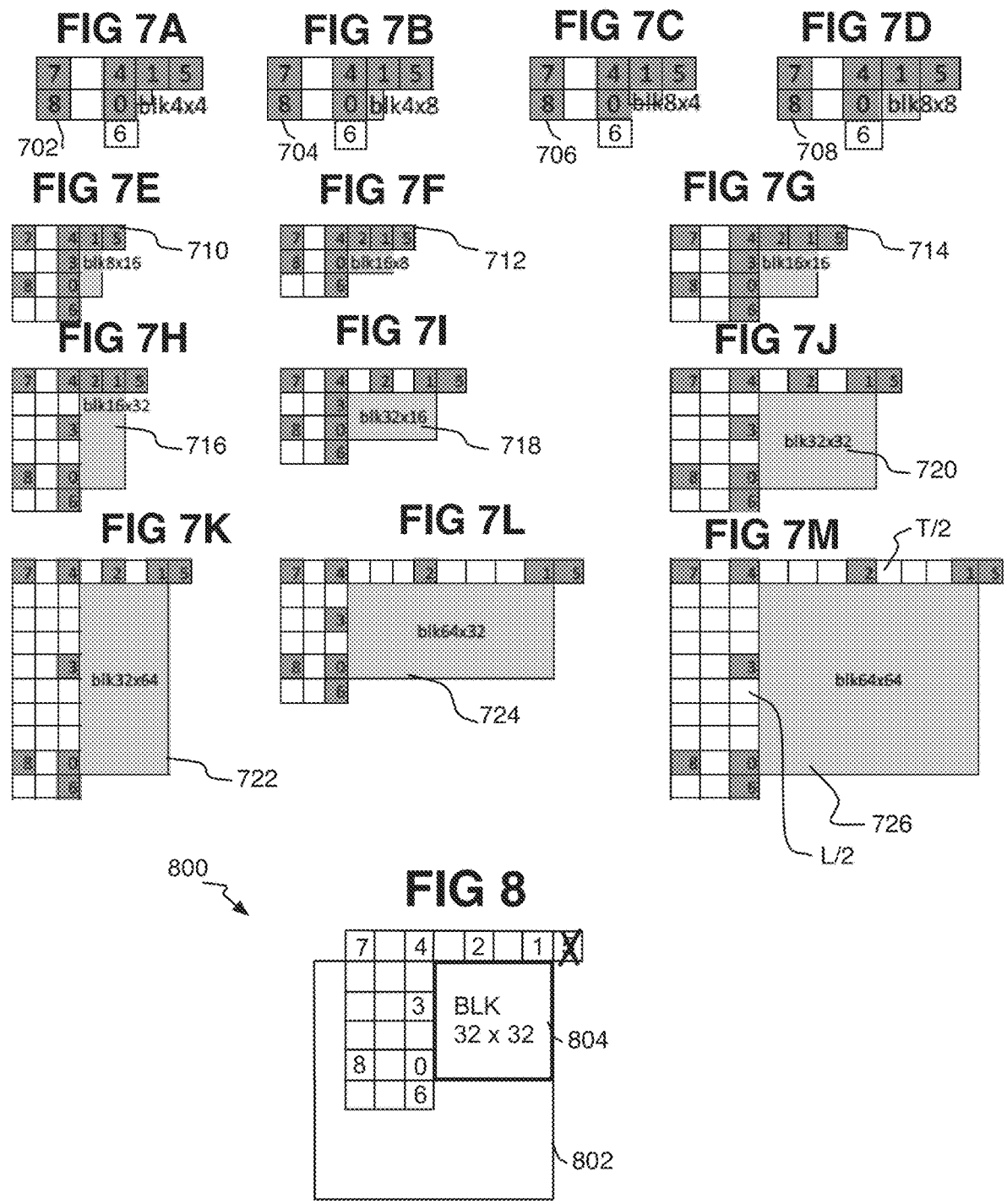

Blk 4 x 4 — 902

Blk 4 x 8 — 904

Blk 8 x 4 — 906

Blk 8 x 8 — 908

Blk 8 x 16 — 910

Blk 16 x 8 — 912

Blk 16 x 16 — 914

Blk 16 x 32 — 916

Blk 32 x 16 — 918

Blk 32 x 32 — 920

Blk 32 x 64 — 922

Blk 64 x 32 — 924

Blk 64 x 64 — 926

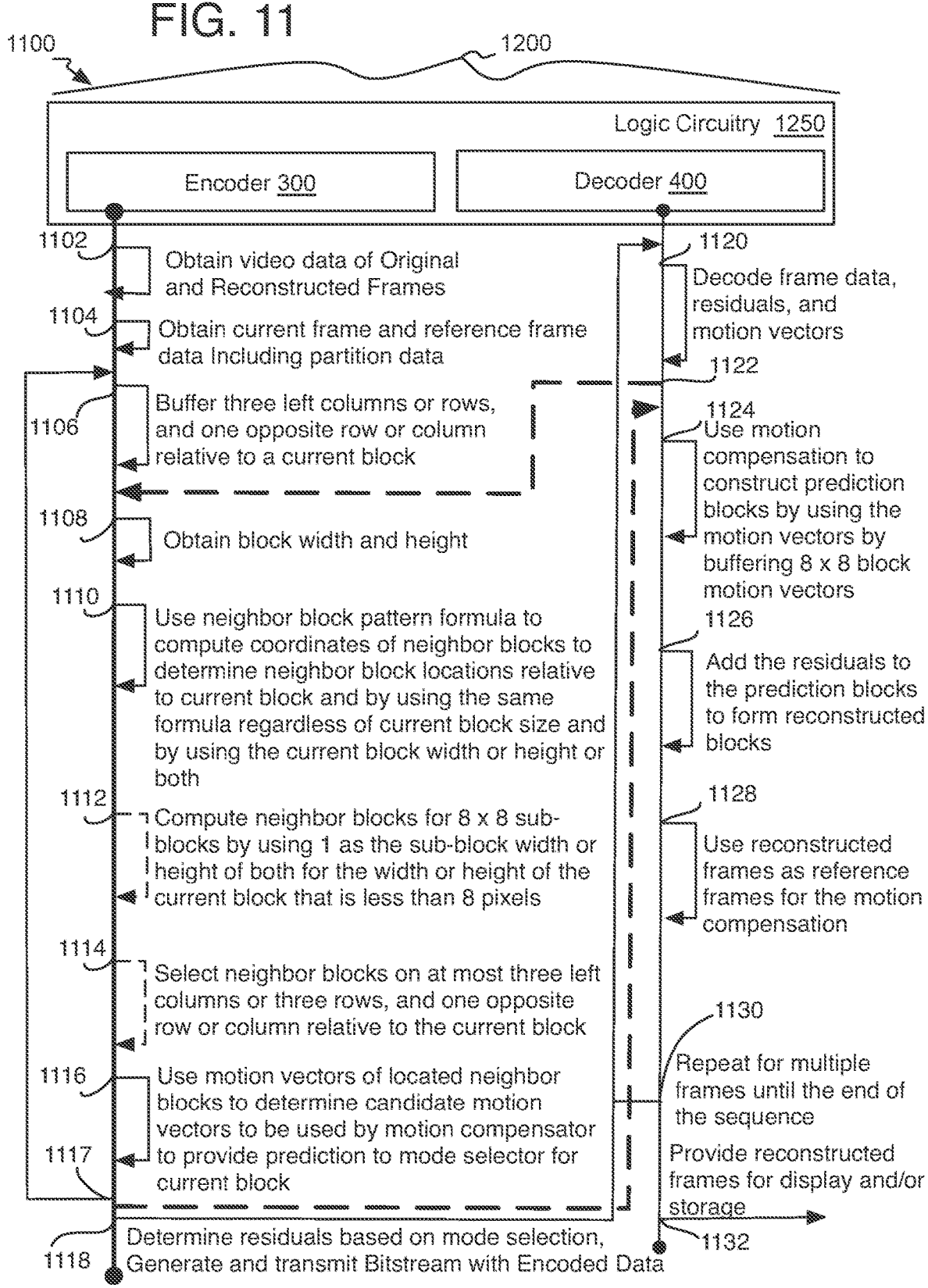

METHOD AND SYSTEM OF MOTION ESTIMATION WITH NEIGHBOR BLOCK PATTERN FOR VIDEO CODING

BACKGROUND

Due to ever increasing video resolutions, and rising expectations for high quality video images, a high demand exists for efficient image data compression of video while performance is limited for coding with existing video coding standards such as VP #standards such as VP9. The aforementioned standards use expanded forms of traditional approaches to address the insufficient compression/quality problem, but the results are still insufficient.

These video coding processes use inter-prediction at an encoder to reduce temporal (frame-to-frame) redundancy. Motion estimation is a key operation in an encoder. Motion estimation is the process of finding areas of a frame being encoded that are most similar to areas of a reference frame in order to find the motion vectors. Motion vectors are used to construct predictions for the encoded block. The difference between the prediction and real (original) data is called residual data and is compressed and encoded together with the motion vectors.

By the conventional block-matching, frames are partitioned into blocks of multiple sizes. The individual blocks on a current frame are compared to some number or each block position of a search window on a reference frame. The lowest sum of absolute difference (SAD), mean square error (MSE), or other metric is considered a best match. While very accurate, the search reduces performance.

One alternative strategy to increase efficiency is to use the motion vectors already established for neighbor blocks near a current block being predicted. This operates on the principle that blocks near each other are more likely to have content of the same object in an image, and therefore are more likely to have the same or similar motion vector. Thus, some combination or form of motion vectors of a set of neighbor blocks often can be used as candidate motion vectors of the current block. For VP9, the neighbor block locations are fixed, pre-determined, and placed on a look-up table for each different block size resulting in hardware that is fixed relative to values on the look-up table and cannot be easily changed when such values are changed. Also, 8×8 pixel potential neighbor blocks must have both an 8×8 block-based motion vector in the case where the current block is 8×8 or larger, and two 4×4 neighbor sub-blocks each to provide a motion vector when adjacent a current block that is smaller than an 8×8 block to be predicted. Additionally, the neighbor block pattern extends over a relatively wide area that is three columns to the left and three rows above the current block. These limitations result in a large amount of data to be held in memory during the neighbor block operations increasing required memory capacity and bandwidth, and therefore required chip area on a memory, and when performed by hardware, such as an accelerator, make it difficult to implement neighbor block determinations on the hardware by increasing the required logic, thereby increasing the gate count (or chip area) of the hardware, which also increases costs.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 4 is an illustrative diagram of a decoder for a video coding system;

FIG. 5 is a flow chart showing a motion estimation process using a neighbor block pattern for video coding according to the implementations herein;

FIG. 6 is a neighbor block pattern formula used according to the implementations herein;

FIGS. 7A-7M are schematic diagrams showing frame partitioning and neighbor block locations for current blocks of different sizes and on a three column, one row pattern according to the implementations herein;

FIG. 8 is a schematic diagram showing frame partitioning and neighbor block locations including an external block relative to a current block according to the implementations herein;

FIG. 11 is an illustrative diagram of an example system in operation for providing a motion estimation process using a neighbor block pattern for video coding according to the implementations herein;

DETAILED DESCRIPTION

Figures 1, 1A:
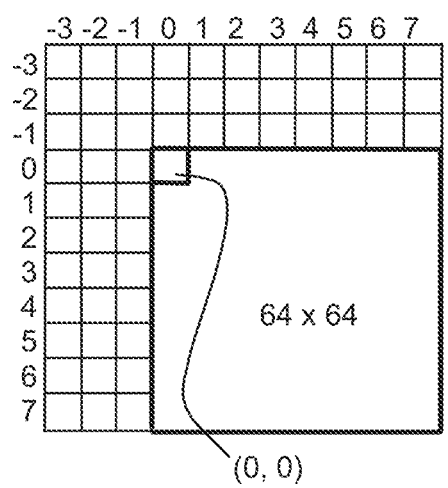
FIG. 1 is an annotated look-up table of neighbor blocks used for motion estimation.
FIG. 1A is a schematic diagram of a partitioned frame to show the numbering of blocks around a current frame for determining the location of neighbor blocks.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof unless specified herein. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to motion estimation with neighbor block pattern for video coding.

As mentioned above, current video coding standards, such as VP9 can be improved by improving the motion estimation so that speed and efficiency are increased by reducing the amount of memory transactions, the amount of data that needs to be stored during motion estimation, and by reducing the amount of operations so that the motion estimation, or at least the neighbor block determination, may be performed with reduced logic and reduced gate counts on hardware, enabling such operations to be performed on-chip.

Particularly, during inter-prediction at an encoder, motion estimation is applied to find the best match between an area of a frame such as a block or sub-block that is being encoded in part of a current frame and a similar block in a reference frame. A motion vector (MV) is the difference of spatial coordinates of the block being encoded (the current block) and the block in the reference frame being examined. With this process, the motion vectors, and the small difference between the blocks just mentioned, are encoded instead of encoding the pixel data of an entire frame. The motion estimation is applied in a way to find the closest or best match (or match that is most sufficient) to minimize the cost of the matching process, and strike the right balance between prediction accuracy to provide a high quality picture compression and reduction in delay and lags in the streaming or transmission speed of the compressed video. The cost is usually computed as a combination of a measure of the mismatch between the current block and the reference block, and the amount of bits used to encode the motion vectors.

For VP9, a checklist of pre-determined motion vectors from neighbor blocks is established. This includes up to nine spatial or neighbor blocks on the same frame as the current block being predicted. One temporal block is also used and has a motion vector from the previous block but in the same location as the current block. The motion vectors of these blocks are selected to form two candidate motion vectors (whether separately or some combined form such as a median) to form a prediction list of candidate motion vectors that are provided for motion compensation. Also, VP9 partitions frames into blocks of various sizes from 64×64 superblocks down to quad-tree obtained 4×4 blocks. The selection of the spatial neighbors is complex because each block size must have its neighbor block locations determined separately. No generic formula exists that can apply to multiple block sizes.

Referring to FIGS. 1, 1A, and 2A-2M, instead, VP9 provides a conventional pre-determined look-up table such as table 100 where each row in the table is provided to correspond to a block of a different size, and lists the fixed coordinates of the neighbor blocks that are to be used for that indicated block size. All coordinates are based on a count of 8×8 blocks. The spatial neighbor locations are retrieved individually by searching the look-up table 100 by using the current block size as the criteria. The table has been annotated to show the corresponding block size and corresponding partition or block arrangements 202 to 226 on FIGS. 2A to 2M respectively. Also, the coordinates on the table are provided as shown on partition example 102 (FIG. 1A) where the upper left 8×8 pixel corner block of the current block (no matter the size of the current block whether larger than 8×8 or small and fitting within the 8×8 block) is considered location (0, 0) and where the up and left directions away from the (0, 0) block location are negative, and down and to the right are positive. The rows and columns are numbered accordingly for clarity. The disclosed method and system described below also maintains this numbering scheme.

For example, a 4×4 block listed on the top row of table 100 (and corresponding to arrangement 202 (FIG. 2A)) has eight neighbor blocks each at a coordinate shown in the row and as located on block arrangement 202. Since the table provides fixed neighbor block patterns stored at on-chip read-only memory (ROM) for example, the neighbor block patterns cannot be easily modified. In order to change the neighbor block coordinates on the table, the hardware must be modified by specialized manufacturer equipment or access programs, or must be replaced. This highly limits the ways the hardware can be re-used for newer neighbor block patterns.

As to the conventional block arrangements 202 to 226, the current block to be predicted is referred to by its size as (blk a×b) and a slightly different light shading. The numbers shaded darker indicate neighbor block positions 0 to 7 for each block size, and corresponding to the block coordinates from left to right on each row of the look-up table 100. Thus, each block size has eight spatial neighbor blocks.

Figure 2A:
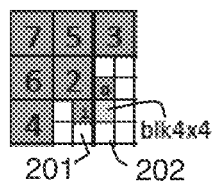
FIGS. 2A-2M are schematic diagrams showing frame partitioning and neighbor block locations for current blocks of different sizes.
Figure 2B:
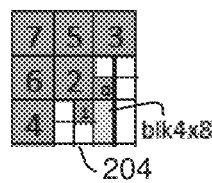
Figure 2C:
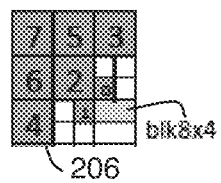
Figure 2D:
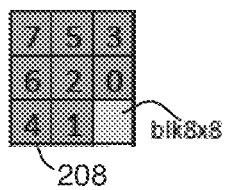
Figure 2E:
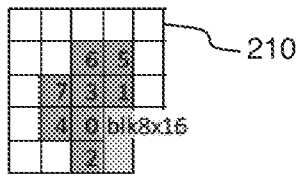
Figure 2F:
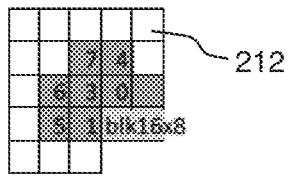
Figure 2G:
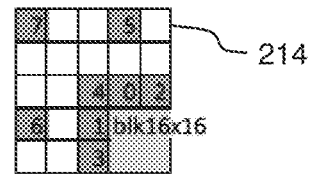
Figure 2H:
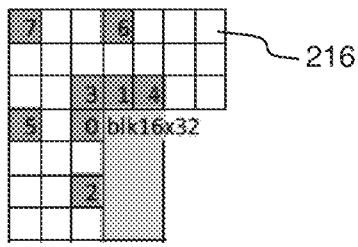
Figure 2I:
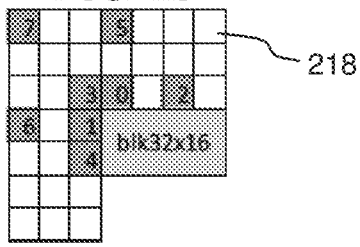
Figure 2J:
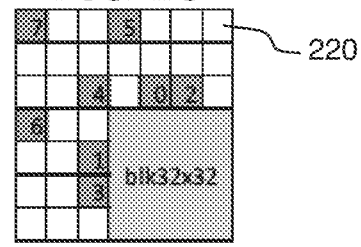
Figure 2K:
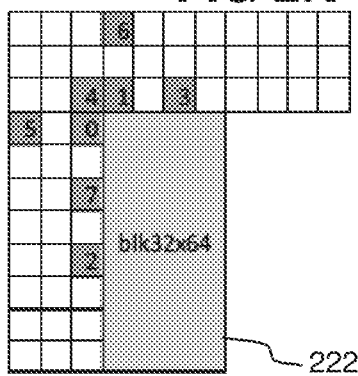
Figure 2L:
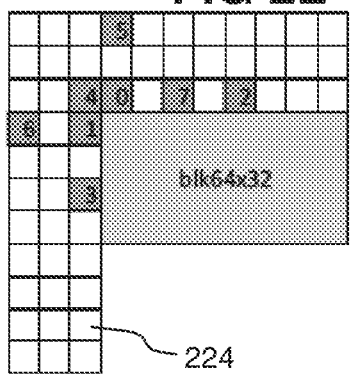
Figure 2M:
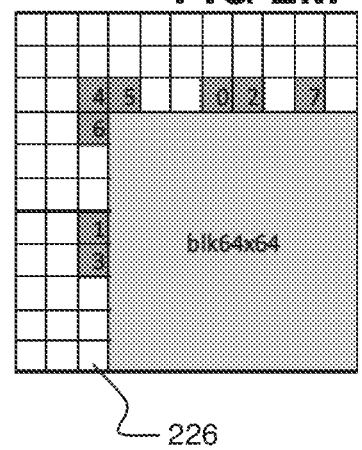

Referring to FIGS. 2A-2C, block arrangements 202, 204, and 206 have current blocks that are sub-blocks of an 8×8 block and are sizes of 4×4, 4×8, and 8×4 respectively. Each of these sub-blocks uses a 4×4 block motion vector from sub-blocks 0 and 1 from a top and left neighbor 8×8 block and that is adjacent the 8×8 block that the current sub-block is within, as shown by block arrangements 202, 204, and 206. These sub-blocks also may be used to construct a motion vector predictor list that holds the motion vectors to be used as candidate motion vectors (explained below), while for all other block sizes, motion vectors of 8×8 neighbor blocks are used to construct the motion vector predictor list. To support these tasks, then, the 8×8 neighbor blocks that could be used to provide 4×4 block neighbors for a (4×4), (4×8), or (8×4) current sub-block must have both an 8×8 block (granularity) motion vector stored as well as at least two 4×4 block (granularity) motion vectors stored in a first row and first column buffer for the row and column that is adjacent the 4×4 current sub-block to be predicted. The 8×8 blocks must have two 4×4 potential neighbor motion vectors in case the other 4×4 block location 201 is adjacent a 4×4 current block for example. Such a configuration undesirably adds memory size requirements and bandwidth for memory transactions resulting in more delay and more memory area on-chip at both the encoder and decoder, and the complexity of using the sub-blocks as neighbor blocks and current blocks adds complexity to the hardware logic used to determine the motion vectors which also increases gate count (logic area on-chip), line buffer size, and memory bandwidth, which all increases monetary costs.

Also, the VP9 and other standards use a neighbor block pattern extending over three left columns and three upper rows next to the current block being predicted. Thus, the present systems store all of the motion vectors of the three left columns and three rows as 8×8 block motion vectors (with the 4×4 MVs in the first column and row buffer as mentioned) for each 64×64 superblock, and for both encoding and decoding. In other words, the length of the data stored for a current block is at least as long as the side of a superblock, and needs a three line buffer for both the columns and rows. This also increases the memory bandwidth and gate counts since such a large amount of data is to be processed for each superblock, which also increases the cost of the system.

To resolve these issues, the presently disclosed method and system of motion estimation provide a motion vector predictor derivation method that reduces memory capacity and bandwidth needs while providing a hardware-operated flexible formula that can be used with a variety of different block sizes and neighbor block configurations on both the encoder and the decoder. This eliminates the need for a look-up table that uses the block size as the search criteria and lists fixed neighbor locations for each block size. The formula is used to identify the spatial neighbor motion vector (MV) locations for multiple or all block sizes, and the use of 4×4 neighbor block motion vectors has been eliminated. Thus, now only a single 8×8 motion vector granularity may be stored and used. The present method also reduces memory line buffer capacity requirements from three top rows to one row that may be stored in a single off-chip line buffer, while having at most three left columns that can be stored at on-chip memory. This results in a significant reduction in required memory capacity and memory bandwidth, and reduces the amount of logic needed to implement the motion predictor derivation hardware, thereby reducing the overall gate count (logic area) of the hardware.

These features are accomplished by using a neighbor block pattern formula that can be used no matter the size of the current block to be predicted. The neighbor block pattern formula uses the width and/or height of the current block to determine the location of neighbor blocks relative to the current block. This includes equations to place the neighbor blocks near corners of the current block or near a center of the width or height along an edge of the current block to name a few examples. The details are described below.

Figure 3:
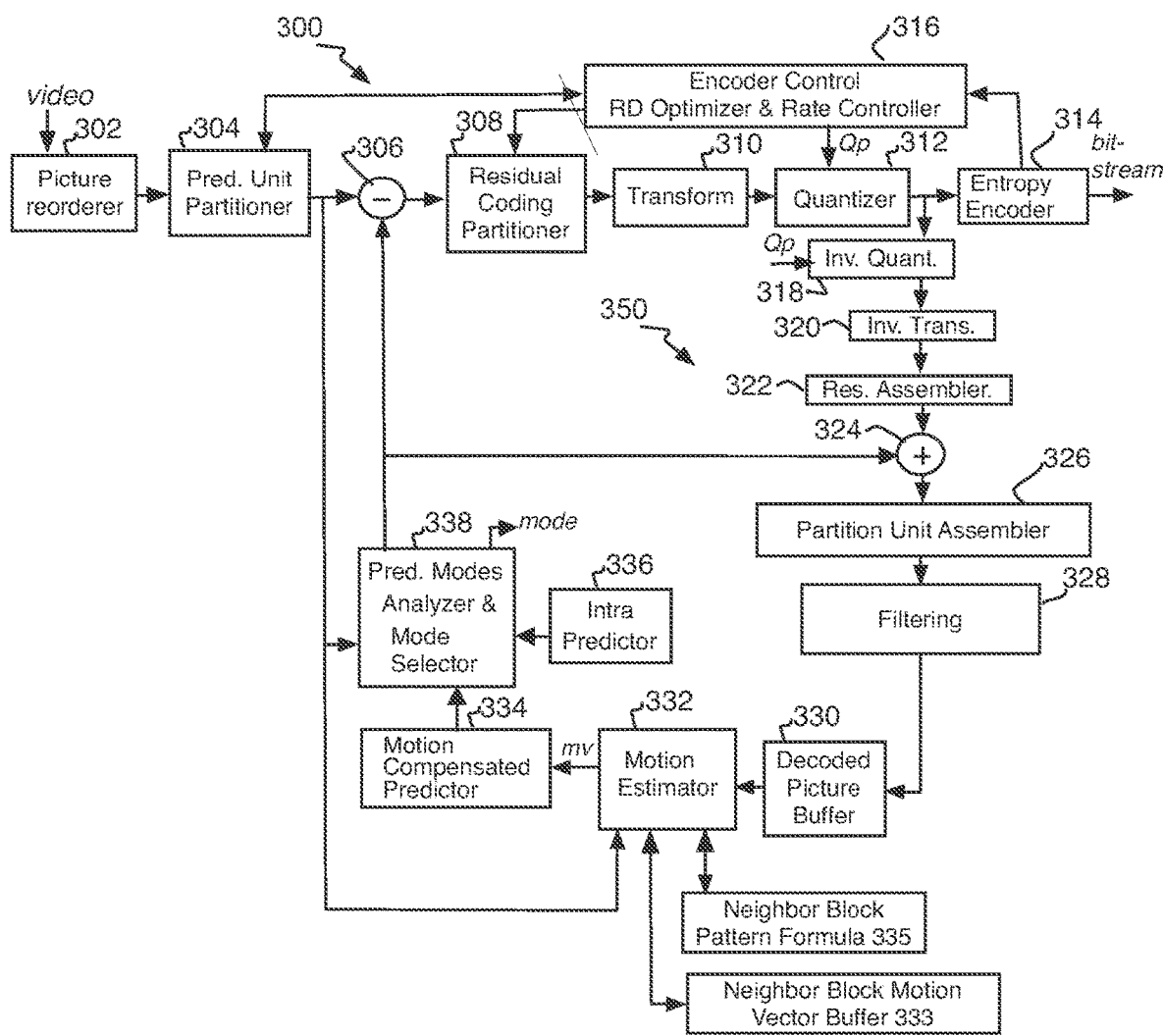
FIG. 3 is an illustrative diagram of an encoder for a video coding system.

Now in more detail and while referring to FIG. 3 to place the present methods in context, an example video coding system 300 is arranged with at least some implementations of the present disclosure to perform motion estimation with the neighbor block pattern formula described herein. In various implementations, video coding system 300 may be configured to undertake video coding and/or implement video codecs according to one or more standards. Further, in various forms, video coding system 300 may be implemented as part of an image processor, video processor, and/or media processor and undertakes inter-prediction, intra-prediction, predictive coding, and residual prediction. In various implementations, system 300 may undertake video compression and decompression and/or implement video codecs according to one or more standards or specifications, such as, for example, VP9 or other VP#-based standards or standards that use elements of a VP #standard, but could also be applied to H.264 (MPEG-4), H.265 (High Efficiency Video Coding or HEVC), and other standards where relevant or where modified to be compatible with VP based motion estimation. Although system 300 and/or other systems, schemes or processes may be described herein, the present disclosure is not necessarily always limited to any particular video encoding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

For the example video coding system 300, the system may be an encoder where current video information in the form of data related to a sequence of video frames may be received for compression. The system 300 may partition each frame into smaller more manageable units (described in greater detail below), and then compare the frames to compute a prediction. If a difference or residual is determined between an original block and prediction, that resulting residual is transformed and quantized, and then entropy encoded and transmitted in a bitstream out to decoders or storage. To perform these operations, the system 300 may include an input picture buffer (with optional picture reorderer) 302, a prediction unit partitioner 304, a subtraction unit 306, a residual partitioner 308, a transform unit 310, a quantizer 312, an entropy encoder 314, and a rate distortion optimizer (RDO) and/or rate controller 316 communicating and/or managing the different units. The controller 316 manages many aspects of encoding including rate distortion or scene characteristics based locally adaptive selection of right motion partition sizes, right coding partition size, best choice of prediction reference types, and best selection of modes as well as managing overall bitrate in case bitrate control is enabled.

The output of the quantizer 312 also may be provided to a decoding loop 350 provided at the encoder to generate the same reference or reconstructed blocks, frames, or other units as would be generated at the decoder. Thus, the decoding loop 350 uses inverse quantization and inverse transform units 318 and 320 to reconstruct the frames, and residual assembler 322, adder 324, and partition unit assembler 326 to reconstruct the units used within each frame. The decoding loop 350 then provides filters 328 to increase the quality of the reconstructed images to better match the corresponding original frame. This may include a deblocking filter, a sample adaptive offset (SAO) filter, and a quality restoration (QR) filter. The decoding loop 350 also may have a decoded picture buffer 330 to hold reference frames. The encoder 300 also has a motion estimation module or unit 332 that provides candidate motion vectors as referred to below, a motion compensation module 334 that uses the candidate motion vectors, and an intra-frame prediction module 336. Both the motion compensation module 334 and intra-frame prediction module 336 may provide predictions to a prediction modes analyzer and selector 338 that selects the best prediction mode for a particular block. As shown in FIG. 3, the prediction output of the selector 338 in the form of a prediction block is then provided both to the subtraction unit 306 to generate a residual, and in the decoding loop to the adder 324 to add the prediction to the residual from the inverse transform to reconstruct a frame.

More specifically, the video data in the form of frames of pixel data may be provided to the input picture buffer 302. The buffer 302 holds frames in an input video sequence order, and the frames may be retrieved from the buffer in the order in which they need to be coded. For example, backward reference frames are coded before the frame for which they are a reference but are displayed after it. The input picture buffer also may assign frames a classification such as I-frame (intra-coded), P-frame (inter-coded, predicted from a previous reference frame), and compound frames (inter-coded frame which is an average of two reference frames). In I frames, spatial prediction is used, and in one form, only from data in the frame itself. In P frames, temporal (rather than spatial) prediction may be undertaken by estimating motion between frames.

As to the partitioning of the frames, when a VP9 type standard is being used, the prediction unit partitioner 304 may divide the frames into very large tiles (such as 3 to a frame) which may or may not be used by the encoder, and the tiles into superblocks (64×64) as the main divider of the frame for the encoder. Quad tree derived divisions thereof can be used and as mentioned including horizontal and vertical divisions. Such divisions may include block sizes of 32×64, 64×32, 32×32, 32×16, 16×32, 16×16, 8×16, 16×8, 8×8, 8×4, 4×8, and 4×4. The 8×8 blocks are the basis of motion vectors during inter-prediction. It should be noted, however, that the foregoing are only example divisions, and many others could apply including HEVC divisions, such as LCUs, PUs, CUs, etc. As used herein, the term "block" by itself does not necessarily refer to any specific size or shape of block.

Also in video coding system 300, the current video frame divided into partitions may be provided to the motion estimation unit or estimator 332. System 300 may process the current frame in the designated units of an image in raster or different scan order or in parallel diagonal wave-type processing order where a current block may use the motion vectors already established in blocks above and to the left of the current block. For this purpose, a neighbor block motion vector buffer 333 may be provided to hold the motion vectors from previously predicted blocks that are in an area that could be neighbor blocks to a current block being analyzed. As described below, the required capacity of this buffer 333 has been greatly reduced, and part of the buffer (such as at most three columns to the left of a current block) may be internal or on-chip, and part of the buffer (such as for a single row or line buffer) may be external or off-chip. When video coding system 300 is operated in inter-prediction mode, motion estimation unit 332 may generate one or more motion vectors in response to the current video frame and a reference video frame. A block-based search method supplemented by using the motion vectors of neighbor blocks as described herein may be used to match a block of a current frame with a candidate block on reference frame, and thereby determine a motion vector to be encoded for a prediction block.

By one example similar to VP9, and as arranged herein, a neighbor block pattern formula 335 stored in ROM for example, may or may not be operated by firmware or fixed function hardware, and may be used to compute spacial neighbor motion vector locations relative to a current block on a frame as explained in detail below. The neighbor block locations of at most nine (or other number) of spatial neighbor blocks are listed on a checklist. The checklist is reviewed block by block to determine which blocks have a motion vector. The motion vectors of the neighbor blocks on the checklist then may be placed one by one in an MV predictor list holding a maximum two candidate MVs to be passed on to the motion compensator for prediction. Generally, the predictor list is filled from the checklist and one temporal MV in the order as provided by the formula, and as space becomes available on the predictor list, and by one form, alternating between using the latest spatial MV found and the temporal MV. More than one reference (such as three) could be alternatively referred to for the temporal block.

As mentioned, the predictor list may include two MV candidates referred to as the nearest MV which is the first MV on the list, and a near MV which is the second MV on the list. A new MV is the nearest MV plus a delta MV derived in a block search. Also, depending on the timing of when an MV is being fetched for prediction at the motion compensator module 334, an empty space may be filled with a zero MV (ZMV) which refers to no motion from the reference block to the current block MV is (0, 0).

The motion compensation module 334 then may use the reference video frame and the two candidate motion vectors provided from the prediction list by motion estimation module 332 to provide multiple candidate motion vectors to the motion compensator to provide alternative predictions for selection by the mode selector. Many options are possible.

The predicted block then may be subtracted at subtractor 306 from the current block, and the resulting residual is provided to the residual coding partitioner 308. Coding partitioner 308 may partition the residual into one or more blocks, and by one form for VP9, dividing the prediction partitions further into transform partitions (32×32, 16×16, 8×8, or 4×4 for example) which may be division sizes that are not the same as the prediction (or motion) partition sizes. The relevant block or unit is transformed into coefficients using variable block size discrete cosine transform (VBS DCT) and/or 4×4 discrete sine transform (DST) to name a few examples. Using the quantization parameter (Qp) set by the controller 316, the quantizer 312 then uses lossy resampling or quantization on the coefficients. The generated set of quantized transform coefficients may be reordered and entropy coded by entropy coding module 314 to generate a portion of a compressed bitstream (for example, a Network Abstraction Layer (NAL) bitstream) provided by video coding system 300. In various implementations, a bitstream provided by video coding system 300 may include entropy-encoded coefficients in addition to side information used to decode each block (e.g., prediction modes, quantization parameters, motion vector information, partition information, in-loop filtering information, and so forth), and may be provided to other systems and/or devices as described herein for transmission or storage.

The output of the quantization module 312 also may be provided to de-quantization unit 318 and inverse transform module 320 for the decoding loop 350. De-quantization unit 318 and inverse transform module 320 may implement the inverse of the operations undertaken by transform unit 310 and quantization module 312. A residual assembler unit 322 then may reconstruct the residuals. The output of the residual assembler unit 322 then may be combined at adder 324 with the predicted frame to generate a rough reconstructed block. A partition unit assembler 326 then reconstructs the partitions to complete the frame reconstruction.

The quality of the reconstructed frame is then improved by running the frame through the filters 328. The filtered frames are provided to a decoded picture buffer 330 where the frames may be used as reference frames to construct corresponding predictions for motion estimation and compensation as explained above and as described below. When video coding system 300 is operated in intra-prediction mode, intra-frame prediction module 336 may use the reconstructed pixels of the current frame to undertake intra-prediction schemes that will not to be described in greater detail herein.

In some examples, video coding system 300 may include additional items that have not been shown in FIG. 3 for the sake of clarity. For example, video coding system 300 may include a processor, a radio frequency-type (RF) transceiver, splitter and/or multiplexor, a display, and/or an antenna. Further, video coding system 300 may include additional items such as a speaker, a microphone, an accelerometer, memory, a router, network interface logic, and so forth.

Referring to FIG. 4, a system 400 may have, or may be, a decoder, and may receive coded video data in the form of a bitstream. The system 400 may process the bitstream with an entropy decoding module 402 to extract quantized residual coefficients as well as the motion vectors, prediction modes, partitions, quantization parameters, filter information, and so forth. The system 400 then may use an inverse quantization module 404 and inverse transform module 406 to reconstruct the residual pixel data. The system 400 then may use a residual coding assembler 408, an adder 410 to add the residual to the predicted block, and a partition unit assembler 412. The system 400 also may decode the resulting data using a decoding loop employing, depending on the coding mode indicated in syntax of the bitstream and implemented via prediction mode switch or selector (which also may be referred to as a syntax control module) 422, either a first path including an intra prediction module 420 or a second inter-prediction decoding path including one or more filters 414. The second path may have a decoded picture buffer 416 to store the reconstructed and filtered frames for use as reference frames as well as to send off the reconstructed frames for display or storage for later viewing or another application or device. A motion compensated predictor 418 utilizes reconstructed frames from the decoded picture buffer 416 as well as motion vectors from the bitstream and stored in a motion vector buffer 417 including candidate neighbor block motion vectors to reconstruct a predicted block.

Alternatively, the decoder 400 could have motion estimation capability and also has its own motion estimation unit 413. In this case, the motion estimation unit 413 may have a neighbor block motion vector buffer 415 to store motion vectors of potential neighbor blocks in an area that can be used as neighbor blocks (such as the three columns and one row), and may have part on-chip and part external memory as mentioned above for the encoder. Also as mentioned for the encoder, the motion estimator 413 at the decoder has or has access to a neighbor block pattern formula 419 stored in ROM as with the encoder as well. In this case, the decoder also determines neighbor block locations for a current block, lists the located blocks on a checklist, determines which blocks on the checklist have a motion vector, and places two of the found motion vectors onto the prediction list of candidate motion vectors. The motion compensated predictor 418 then uses the candidate motion vectors to form predictions.

A prediction modes selector 422 uses the predictions and sets the correct mode for each block. The functionality of modules described herein for systems 300 and 400, except for the motion estimation unit 332 and 413 described in detail below, are well recognized in the art and will not be described in any greater detail herein.

Referring now to FIG. 5, an example process 500 is arranged in accordance with at least some implementations of the present disclosure. In general, process 500 may provide a computer-implemented method of motion estimation with neighbor block pattern for video coding. In the illustrated implementation, process 500 may include one or more operations, functions or actions as illustrated by one or more of operations 502 to 508 numbered evenly. By way of non-limiting example, process 500 will be described herein with reference to operations discussed with respect to FIGS. 3-4 above and may be discussed with regard to example systems 300, 400 or 1200 discussed below.

The process 500 may comprise "receive multiple frames of pixel data" 502, and particularly at a motion estimation unit within a decoding loop on an encoder that receives reconstructed and filtered reference frames from buffer 330 as well as data of current frames to be encoded. This also includes the data defining the partitions or blocks on each frame.

The process 500 also may comprise "determine at least one motion vector candidate extending between a current block on a current frame and a reference block on a reference frame" 504. Thus, during inter-prediction, motion estimation involves determining motion vectors extending between a current block on a current frame and a matching reference block on a reference frame by block matching techniques. In order to reduce the amount of block matching due to its heavy computational loads and time consumption, motion vectors from blocks previously analyzed may be used to determine the motion vectors of the current block. By one form, this may include determining a group of motion vectors from neighbor blocks relative to the current block. When any one of these neighbor motion vectors are placed on the current block's prediction list, the motion vectors become candidate motion vectors that may be provided to the motion compensation module to determine a prediction for the current block as already explained herein.

The process 500 then may comprise "determine spatial neighbor block locations on the same frame as the current block using a neighbor block pattern formula to compute at least one neighbor block coordinate relative to the position of the current block on the current frame and using substantially the same neighbor block pattern formula regardless of the size of the current block" 506. Thus, instead of a look-up table that uses the current block size as the search criteria and lists fixed coordinate values for each current block size, a neighbor block pattern formula is provided that has an equation to compute one or more coordinates for a neighbor block, where there is at least one equation to compute a coordinate in the formula. By one example form, described below, the formula provides coordinates for neighbor blocks 0 to 8 where seven of the neighbor blocks have one coordinate that is calculated by an equation. By one example, the calculated coordinate is based on the width or height of the current block as counted in the number of 8×8 blocks within the current block. By another form, the equations align the neighbor block with either a corner or edge of the current block, or with a center of a side of the current block. This significantly increases the flexibility of fixed function hardware or firmware operating the formula. Other examples are possible, and the details are provided below.

The process 500 also may comprise "use motion vectors of the neighbor blocks at locations determined by using the at least one neighbor block coordinate and to determine at least one motion vector of the current block" 508. As explained for a VP #type coding standard, once the coordinates of a neighbor block is determined, the neighbor block location may be placed on a checklist. The block locations on the checklist are reviewed one by one until a block with a motion vector of that neighbor block is found and obtained from memory, such as RAM or cache. The neighbor block motion vector then may be placed in order as obtained on a prediction list when a space opens on the prediction list and that holds two candidate motion vectors that may include the nearest, near, new, and/or ZMV motion vectors for the current block for example. These two candidate motion vectors may be provided to the motion compensation unit for determining prediction data of the current block. It will be understood that different video coding standards could be used as well. Also as mentioned, once a prediction is determined, it is provided to a mode selector, and if selected, it is differenced from the actual block and a residual is coded and transmitted to a decoder along with the motion vector. Thereafter, the decoder may reconstruct the frames either by using a motion estimator as well that finds neighbor blocks and provides their neighbor motion vectors to a prediction list, or by transmitting and using the candidate motion vectors and residuals to reconstruct the frames instead, and so that subsequently the frame may be displayed or stored. Thus, it can be stated that the neighbor motion vector pattern formulas may be used to encode or decode the frame or both and then to display the frame.

Some of the other features explained herein include the use of only storing 8×8 block-based motion vectors even for sub-blocks smaller than 8×8, and a limited neighbor block area for searching for placing neighbor blocks of at most three columns to the left of the current block, and one top row for one line buffer where the three columns can be placed in on-chip memory while the one line buffer is placed on external memory (where external is relative to a chip or die, such as an SoC.

Referring now to FIG. 6, one example neighbor block pattern formula 600, as with formulas 335 and 419, lists the coordinates or equations to determine the coordinates for neighbor blocks 0 to 8, and both a horizontal and vertical coordinate for each neighbor block. The coordinate system remains as explained with system 102 (FIG. 1A) where the upper left 8×8 block on the current block is the (0, 0) point of the coordinate system. The formula 600 is shown in pseudo code form. The positioning of each neighbor blocks 0 to 8 is shown on each block or partition arrangements 702 to 726 (FIGS. 7A to 7M).

The example formula 600 first includes two constants to be used in the equations including the width of the current block (num_8×8_blocks_wide) which is a count of the 8×8 blocks along a side of the current block, or the number of pixels (bw) on the side divided by eight (shown as a bit shift >>3 here). The other constant is similar except in the height or y direction to establish the height of the current block (num_8×8_blocks_high). Next, a line on the formula 600 may be provided to determine the coordinate in both x and y directions for each neighbor block 0 to 8. When the side of the current block is less than one block, such as with the 4×4, 4×8, or 8×4 sub-blocks, the width and/or height that is the short side is set at 1.

Starting with neighbor block 0, height coordinate (or row number) is the current block height −1, and the width coordinate (or column number) is −1. This places the 0 neighbor block next to the bottom left corner of the current block along the left edge of the current block and aligned with the bottom edge of the current block (shown clearest at block 0 on arrangement 726 (FIG. 7M) and is referred to as the "left" position.

For neighbor block 1, the row coordinate is −1 and the column coordinate is the equation current block width −1, which positions the 1 neighbor block next to the top right corner of the current block along the top edge of the current block and aligned with the right edge of the current block (see block 1 on arrangement 726 (FIG. 7M)). This position is referred to as the "top" position.

For neighbor block 2, the row coordinate is −1 and the column coordinate is the equation is (current block width −1) divided by 2 (shown as bit shift >>1), which positions the 2 neighbor block in the center of the width of the current block and along the top edge of the current block (see block 2 on arrangement 726 (FIG. 7M)). This position is referred to as the "top-center" position.

For neighbor block 3, the row coordinate is the equation (current block height −1) divided by 2 similar to block 2 except with the height, and the column coordinate is −1. This positions the 3 neighbor block in the center of the left side of the current block and along the left edge of the current block (see block 3 on arrangement 726 (FIG. 7M)). This position is referred to as the "left-center" position.

For neighbor block 4, the coordinates are (−1, −1) which touches, and is diagonal to, the upper left corner of the (0, 0) block in the current block, and is referred to as the top-left position (see block 4 on arrangement 726 (FIG. 7M)).

For neighbor block 5, the row coordinate is −1, and the column coordinate is equal to the current block width (num_8×8_blocks_wide). This positions the 5 neighbor block diagonal to the upper right corner of the current block and along the top edge of the current block. This is considered an external position since it is outside of the column(s) holding the current block, and is referred to as the "top-right" position (see block 5 on arrangement 726 (FIG. 7M)).

For neighbor block 6, the column coordinate is −1, and the row coordinate is equal to the current block height (num_8×8_blocks_high). This positions the 6 neighbor block diagonal to the bottom left corner of the current block and along the left edge of the current block. This also is considered an external position since it is outside of the row(s) holding the current block, and is referred to as the "left-bottom" position (see block 6 on arrangement 726 (FIG. 7M)).

For the neighbor block 7, the row coordinate is −1, and column coordinate −3. This is referred to as the top-left-inthe-third-neighbor-column (or far left-top) position (see block 7 on arrangement 726 (FIG. 7M)).

For the neighbor block 8, the row coordinate is (num_8× 8_blocks_high−1), and the column coordinate is −3. This position is referred to as left-in-the-third-neighbor-column (or just far left) (see block 8 on arrangement 726 (FIG. 7M)).

The order of the neighbor blocks in the formula is maintained as a spatial neighbor checklist once the motion vectors are obtained, and are provided to the prediction list in that order (unless neighbor motion vectors are combined as explained below) which therefore is first-in, first-out (FIFO). The selected order for choosing MVs from the checklist to be placed in the prediction list is used by both the encoder and the decoder. The selection of MVs from the checklist for the prediction list is performed by using known criteria and is explained in greater detail below with process 1000.

Thus, the order of the neighbor block locations in the formula is set with the most important first to the least important last since the neighbor blocks, and their MVs, are selected in FIFO order. It will be understood that the order of the neighbor block positions 0 to 8 within the formula could be changed as well when other orders are desired.

Also, the formula 600 is merely one example and many examples can be used that are different than this example including those that add or remove any of the neighbor block positions listed in the formula 600, or use different positions. By one alternative example, only neighbor blocks 0 to 7 are used. By another example, far left positions 7 and 8 are removed and more central positions are added referred to as left/2 (or L/2) and top/2 (or T/2), where for a current block of 8×x8, L/2=8/2=row 4, and T/2=8/2=column 4 as shown on arrangement 726. Many other variations are possible.

Referring to FIGS. 7A-7M, a neighbor block arrangement or pattern is provided for each available block size in a standard similar to VP9 for one example, and using the formula 600 to place the neighbor blocks as numbered on each arrangement 702 to 726 where the current block and its size for the arrangement is designated as blkaxb (e.g., blk4×4). Where neighbor block positions are missing, the later neighbor blocks are removed as duplicate to another earlier neighbor block already on the arrangement. For example, referring to arrangement 712 (FIG. 7F), the neighbor block 3 is missing because the coordinates of this neighbor block is (0, −1) because the current block height is 1 which means that the row location is row 0 ((1−1)/2=0 according to the formula) since the current block is 16×8. Neighbor block 0 already has coordinates (0, −1) so the neighbor block 3 is not used and is discarded if it is computed at all.

It also will be noticed that all of the arrangements 702 to 726 remain within an area that is one row above the current block, and at most three columns immediately to the left of the current block. It could be one or the other but here both limitations are used. This reduction in the pattern space significantly reduces the memory access for neighbor blocks since all possible spatial neighbors are stored for the pattern space when determining the neighbor block locations. This pattern eliminates two full top rows. This reduction in required memory capacity permits the at most three columns to be placed on on-chip memory. This may increase the on-chip area (or gate count) but it does not significantly affect the memory bandwidth negatively. Usually, increasing the on-chip memory is preferable to increasing the line or motion vector buffer memory. However, the one top row line buffer is still stored off-chip or at external memory to be able to accommodate large frame widths such as with ultra HD clips for 8K video for example. The buffer line may store the MVs of the blocks of the same width as the current block plus one external block (position 5 on the formula). Reducing the area from three rows to a single row buffer, however, still significantly reduces the memory size and bandwidth requirements. It will be understood that the formula may be modified to be used with other alternative neighbor block areas instead such as at most (1, 2, or 3) columns and 3 row area, or other reduced areas such as 1 column and 3 above rows, as long as a current block still will have sufficient previously analyzed blocks with motion vectors above and to the left of the current block.

Referring to FIGS. 7A-7C, the sub-block arrangements 702 to 706 show that the current blocks of sub-block size (4×4, 8×4, 4×8) all have neighbor blocks that are 8×8. As mentioned, this significantly reduces the amount of data stored by eliminating the two 4×4 block motion vectors for each 8×8 block that was stored previously.

Referring to FIG. 8, a block arrangement or pattern 800 is shown for a 32×32 current block 804 that forms the upper right quadrant of a 64×64 superblock 802 so that the neighbor block 5 location determined for the current block 804 is external to the column and row of the superblock 802 and to the right of the superblock (it is not above or to the left of the superblock). In this case, the neighbor block 5 (or this location) is deemed unavailable or unusable and is not checked when this neighbor block is listed on the checklist and exceeds the current superblock column as shown. This is performed to maintain the angled (such as 45 degree) wave-front parallelism used to continuously provide previously analyzed blocks above and to the left of the current block.

Figure 9A:
FIGS. 9A-9M schematic diagrams showing frame partitioning and neighbor block locations for current blocks of different sizes and on a one column, one row pattern according to the implementations herein.
Figure 9B:
Figure 9C:
Figure 9D:
Figure 9E:
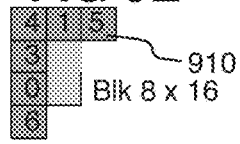
Figure 9F:
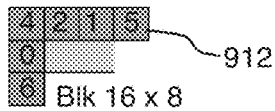
Figure 9G:
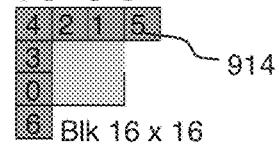
Figure 9H:
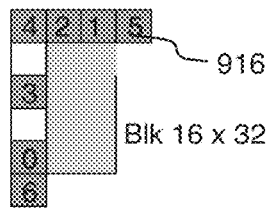
Figure 9I:
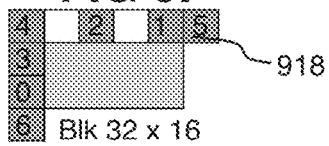
Figure 9J:
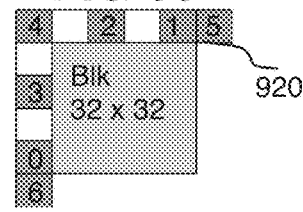
Figure 9K:
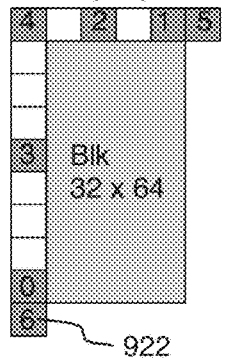
Figure 9L:
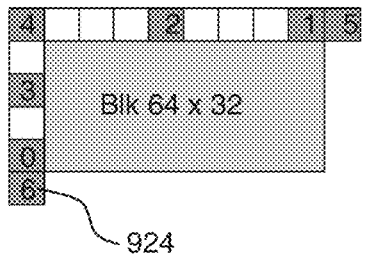
Figure 9M:
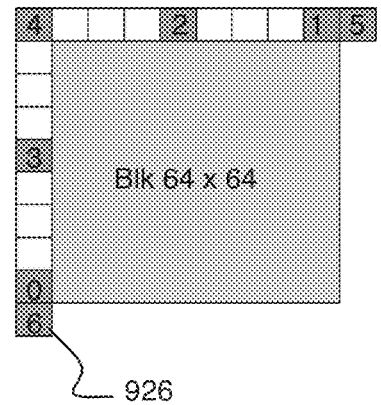

Referring to FIGS. 9A-9M, another possible alternative formula is demonstrated where the formula, and in turn the check list, merely includes neighbor blocks locations 0 to 6 (as defined in formula 600) remaining within a neighbor block area that is merely one row and one column both adjacent the current block. Arrangements 902 to 926 demonstrate how this would apply to the various block sizes and where the current block is designated blkaxb on each arrangement. This option also includes the feature from above that full 8×8 blocks are used as neighbor blocks to the sub-blocks (FIGS. 9A-9C) so that the 8×8 block-based motion vectors are placed on the checklist for the sub-blocks. With this configuration, only the first row and column need to be stored to determine neighbor block locations and motion vectors for a current block. This significantly reduces the required memory capacity and bandwidth, as well as chip size (gate count) as explained above.

Figure 10A:
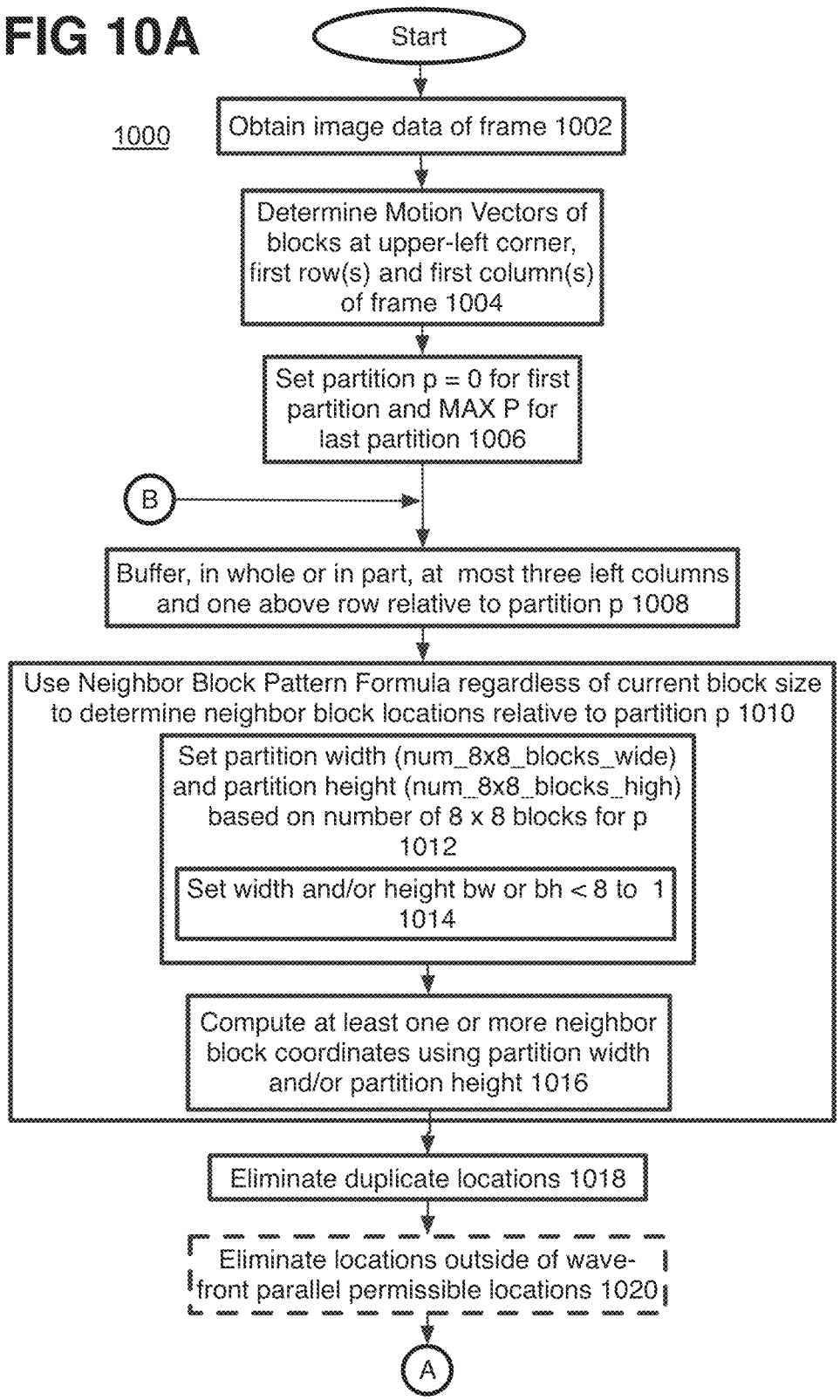
FIGS. 10A-10B is a detailed flow chart showing a motion estimation process using a neighbor block pattern for video coding according to the implementations herein.
Figure 10B:
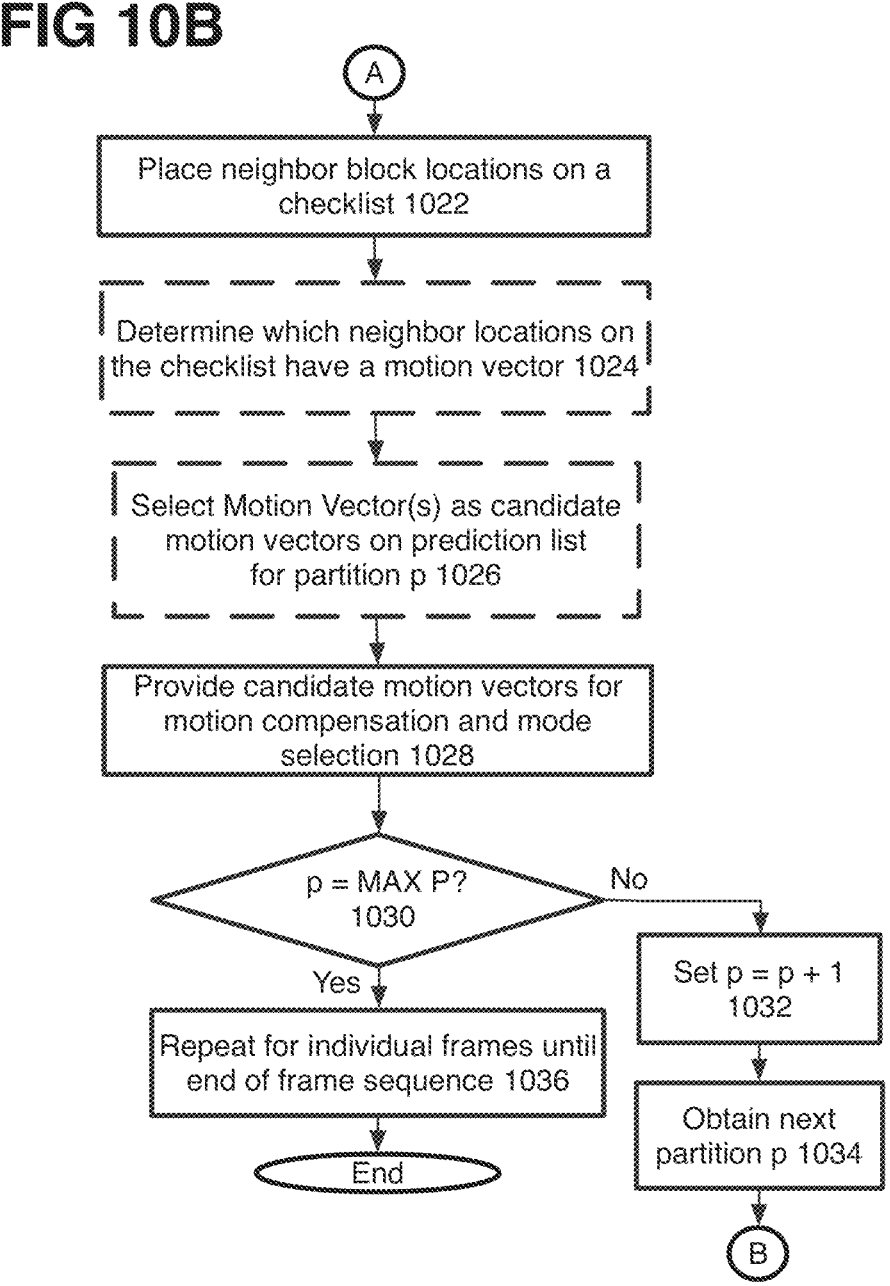

Referring now to FIGS. 10A-10B, a detailed example motion estimation process 1000 is arranged in accordance with at least some implementations of the present disclosure. In general, process 1000 may provide another computer-implemented method of motion estimation with neighbor block pattern formula for video coding. In the illustrated implementation, process 1000 may include one or more operations, functions or actions as illustrated by one or more of operations 1002 to 1036 numbered evenly. By way of non-limiting example, process 1000 will be described herein with reference to operations discussed with respect to FIGS. 3-9M and 12, and may be discussed with reference to example systems 300, 400, and/or 1200 discussed below as well as neighbor block pattern formula 600.

Process 1000 may include "obtain image data of frame" 1002, and particularly, obtaining chroma and luminance pixel data of frames to be encoded as well as reconstructed reference frames as described above. This also may include obtaining data that indicates the partition (or block) locations on each frame. Herein, the terms partition and block are used interchangeably.

Process 1000 may include "determine motion vectors of blocks at upper-left corner, first row(s) and first column(s) of frame" 1004. Thus, for systems that use wave-front parallel processing for neighbor block motion vector use, the process may still start with block searching for new motion vector derivation at least along the left and top edges of the frame. The process may often start by using ZMV on the first block in the upper left corner of the frame, and then either performing new block matching searches on the adjacent left and lower blocks, or by using the ZMV of the first block or both. This process forms a parallel, angled wave-front of blocks that may use the previously analyzed upper and left blocks to determine the motion vector and other data of the current block on the wave-front. Once a sufficient amount of blocks have been analyzed and motion vectors have been determined, such as when three left columns and one top row are processed and available as neighbor blocks, then the process can switch to neighbor block motion vector derivation.

Process 1000 may include "set partition p=0 for first partition and MAX P for last partition" 1006. This operation starts a partition or block counter for the process and may save the maximum number of partitions on the frame to be analyzed for neighbor block MVs. Other alternatives are possible.

Process 1000 may include "buffer, in whole or in part, at most three left columns and one above row relative to the partition p" 1008, and particularly place the available or permissible neighbor block pattern area of a partition in memory where it is accessible to retrieve MVs of neighbor blocks. As described above, this area may include three left columns and one top row adjacent the current block (or partition) to be analyzed. The area is reduced in order to reduce required memory capacity and bandwidth so that the buffer for the at most three left columns may even be placed on-chip, although the single line buffer for the single top row is still placed on external memory. This also may reduce memory hardware area as explained above. By another alternative, only one row and one column adjacent the current block is used as the area, and other alternatives may exist as well.

Process 1000 may include "use neighbor block pattern formula regardless of current block size to determine neighbor block locations relative to partition p" 1010. Specifically, a neighbor block pattern formula, such as formula 600 by one example, may be provided and that lists the coordinate or equation for calculating the coordinate for each neighbor block location listed in the formula. The formula may list the neighbor locations in a certain order and that is to be provided in a checklist and is checked in that order for placement onto a prediction list. The formula may include the same list of neighbor block locations as in formula 600 or any combination of them or something having completely different locations as long as at least one coordinate of at least one neighbor block location is computed by using an equation in the formula and the equation applies to multiple partition (or current block) sizes. Example formula 600 uses an equation for seven coordinates.

Thus, this operation 1010 may include "set partition width (num_8×8_blocks_wide) and partition height (num_8×8_blocks_high) based on number of 8×8 blocks in p" 1012. By one example, the equations in the formula for computing coordinates are based on the width or height of the partition, although it could be some other dimension (such as area). The width and height are measured in the number of 8×8 blocks (or number of pixels divided by 8). This operation also may include "set width and/or height bw or bh<8 to 1" 1014, which refers to using the width and height of 1 for a side of each of the sub-blocks (4×4, 4×8, or 8×4) that is less than 8 pixels. This permits full 8×8 block positions to be used as neighbor blocks for the sub-blocks so that only 8×8 block-based MVs need be stored in memory significantly reducing the amount of memory and hardware required to determine neighbor block MVs as described above.

Process 1000 may include "compute neighbor block coordinates using partition width and/or partition height" 1016. Also as described above with formula 600, the width and height may be used in equations to place the neighbor block by a corner of the partition (current block), which provides an equation such as:

$$((\text{width or height})-1) \tag{1}$$

which is for neighbor block 0 or 1 on formula 600 for example, or at a center along the left edge or top edge of the partition with:

$$((\text{width or height})-1)/2 \tag{2}$$

which is neighbor block 2 or 3 on formula 600 for example, or a position external to the column and row of the partition (current block) which is the value of the width or height itself (such as neighbor blocks 5 or 6 on formula 600). It will be understood, however, that many other positions could be determined as well by using the width or height of the current block or by using another dimension.

Process 1000 may include "eliminate duplicate locations" 1018, and as mentioned for smaller current blocks, two of the neighbor block locations determined from the formula may be the same location on the frame. By one form, the later neighbor block is dropped from the checklist or ignored.

Optionally, process 1000 may include "eliminate locations outside of wave-front parallel permissible locations" 1020, and as explained with arrangement 800, blocks that are external to the superblock of the current partition are marked as unavailable and may be dropped from the checklist so that the computations for the parallel, angled wave-front remains consistent and does not include blocks that are more likely to inject inaccuracies for example.

Process 1000 may include "place neighbor block locations on a checklist" 1022, and therefore, once one of the 8×8 neighbor block locations is set by using the formula, the 8×8 location is added to the checklist. Thereafter, the checklist is checked to determine which neighbor block locations have a motion vector and are therefore available to be placed on the prediction list. Thus, process 1000 may include "determine which neighbor block locations on the checklist have motion vectors" 1024. This recognizes that in some cases some of the locations may not have a motion vector, such as those that were a skip location or were intra coded instead for example. Once it is determined which neighbor block locations are available (have motion vectors), the process places two of the motion vectors onto the prediction list. The neighbor block locations are checked in the same order as set in the formula, and is checked in an FIFO manner. If a location does not have a motion vector, it is discarded and the next location is analyzed.

It will be understood that in addition to the singular neighbor block motion vectors, the neighbor block motion vectors may be combined before being placed in the checklist, or before being placed in the prediction list. Thus, by one form, a partition may have the median motion vector of its neighbor blocks placed in the checklist. Many other alternatives are possible.

Process 1000 may include "select motion vector(s) as candidate motion vectors on prediction list for partition p" 1026. For this operation, and similar to the VP9 standards, the motion vector (MV) predictor list may include two MVs, and in one form, only two MVs. The two MVs are chosen from the nine spatial neighbor MVs obtained from the neighbor blocks as just explained, and one temporal MV. The predictor list is filled by the following process:

a. First, a check of the nine spatial MVs (extending from the same reference picture) is performed one by one and an available MV is inserted to the MV predictor list. If the MV predictor list is full, then the check is stopped.
  b. If the MV predictor list is not full, then check the collocated MV from a previous frame using the same reference frame.
  c. If the MV predictor list is still not full, check the nine spatial MVs (of a different reference picture) and one by one.
  d. If the MV predictor list is still not full, check the collocated MV from the previous frame and with the different reference.
  e. If the MV predictor list is still not full, fill the vacancy with zero (0, 0) MVs.

In the VP9 codec, the first MV in the MV predictor list is called the nearest MV, and the second MV in the predictor list is the near MV. A new MV is equal to the nearest MV plus a delta MV, where the delta MV is derived from a block matching search.

It will be appreciated that other standards and other algorithms for using the neighbor block motion vectors could be used here, such as with HEVC where alternative partitioning is provided for a single frame and may be compared by using inter-prediction. Other examples algorithms and methods may be used with other video coding standards as well.

Process 1000 may include "provide candidate motion vectors for motion compensation and mode selection" 1028, and once a motion vector is a candidate motion vector on the prediction list, it may be provided to the motion compensator to determine an alternative prediction for each motion vector. Each prediction is then provided to the mode selector to select the best prediction based on accuracy and/or cost for coding the residual of a prediction. The winning prediction is then subtracted from the original data of the frame to generate a residual, and the residual as well as the corresponding motion vector is coded and transmitted to a decoder. By one form, all candidate motion vectors and their predictions are transmitted to the decoder so that a selector at the decoder can also select among the candidate motion vectors.

Process 1000 then may include query "p=MAX P?" 1030 to determine whether the last partition has been reached. If not, the process 1000 may include "set p=p+1" 1032, to tick the partitioner counter up one, and then may obtain 1034 the next partition p. The process repeats until the last partition Max P is obtained and analyzed. Then, process 1000 may include "repeat for individual frames until end of frame sequence" 1036. Once the last frame is analyzed, the process ends.

Referring now to FIG. 11, system 1200 may be used for an example process 1100 of motion estimation with neighbor block pattern formula for video coding shown in operation, and arranged in accordance with at least some implementations of the present disclosure. In the illustrated implementation, process 1100 may include one or more operations, functions, or actions as illustrated by one or more of actions 1102 to 1132 numbered evenly, and used alternatively or in any combination. By way of non-limiting example, process 1100 will be described herein with reference to operations discussed with respect to any of the implementations described herein.

Figure 12:
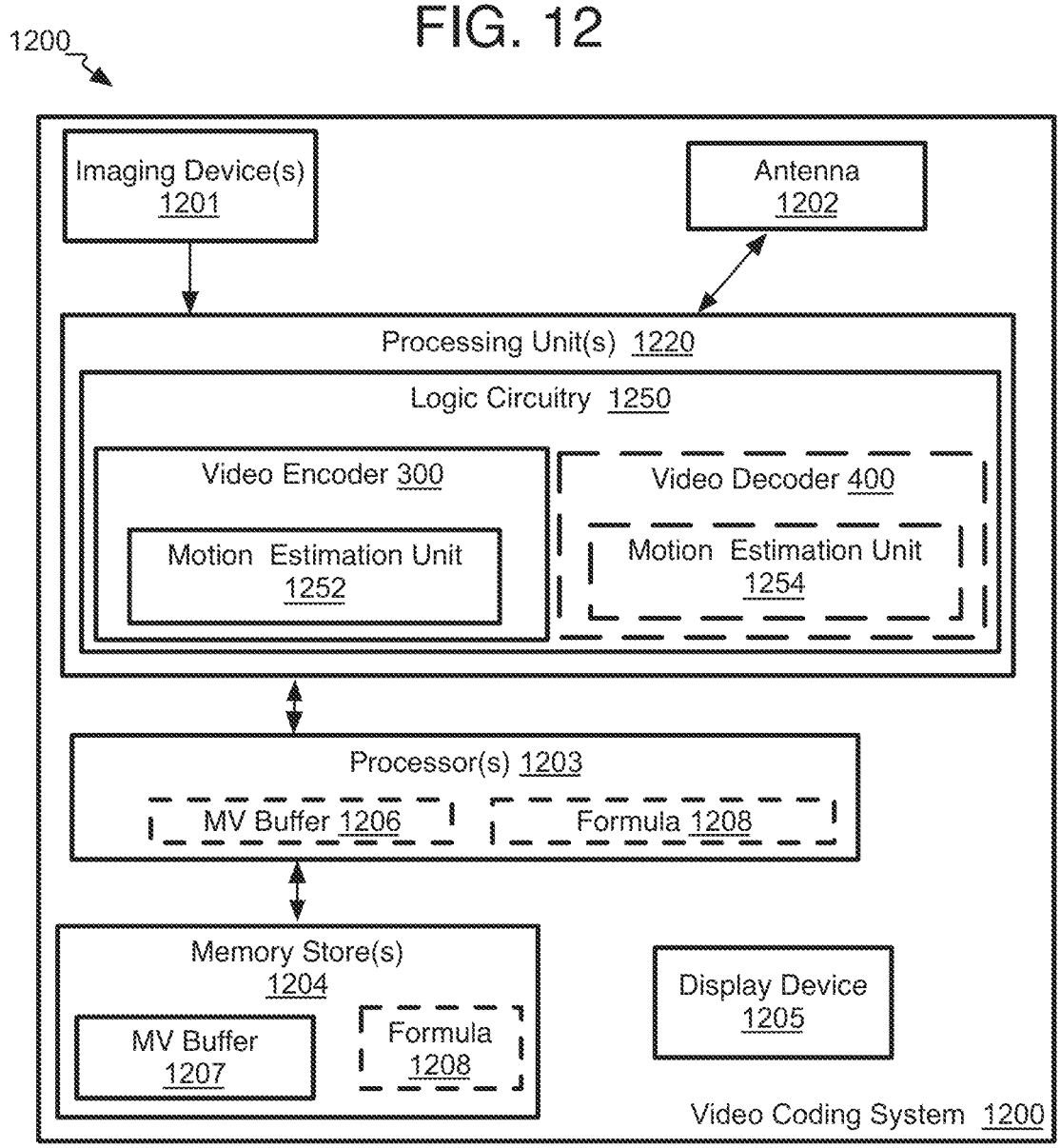
FIG. 12 is an illustrative diagram of an example system.

In the illustrated implementation, system 1200 may include a processing unit 1220 with logic units or logic circuitry or modules 1250, the like, and/or combinations thereof. For one example, logic circuitry or modules 1250 may include the video encoder 300 with a motion estimation unit 1252, and optionally a decoder 400 with an estimation unit 1254, that performs many of the operations related to the neighbor block pattern formula 1208 and determination of neighbor block locations as mentioned above, and optionally the video decoder 400. Although system 1200, as shown in FIG. 12, may include one particular set of operations or actions associated with particular modules, these operations or actions may be associated with different modules than the particular module illustrated here.

Process 1100 may include "obtain video data of original and reconstructed frames" 1102, where the system, or specifically a motion estimation unit at the encoder, may obtain access to pixel data of reconstructed frames. The data may be obtained or read from RAM or ROM, or from another permanent or temporary memory, memory drive, or library as described on systems 1200 or 1300, or otherwise from an image capture device. The access may be continuous access for analysis of an ongoing video stream for example. Process 1100 then may include "obtain current frame and reference frame data including partition data" 1104 of a reconstructed frame so that blocks to be encoded can be matched to reference blocks during the motion estimation search.

Process 1100 may include "buffer at most three left columns or three rows, and one opposite row or column relative to the current block" 1106, and as mentioned above, to have all or most of the motion vectors that might be used as neighbor block MVs. As noted, at most three columns may be used to provide the column buffer on on-chip memory. Also as mentioned, this is one alternative area and others could be used as well such as that shown for arrangements 902 to 926 (FIGS. 9A-9M) with one row and one column.

Process 1100 may include "obtain block width and height" 1108, and also as mentioned above, computed as the number of 8×8 blocks on a side of a current block.

Process 1100 may include "use neighbor block pattern formula to compute coordinates of neighbor blocks to determine neighbor block locations relative to current block and by using the same formula regardless of current block size and by using the current block width or height or both" 1110. Thus, the equations use the width or height of the current block as a variable in the equation to determine a coordinate for a neighbor block location. In this way, the formula is not limited to any particular block size, and by one form, none of the neighbor block locations are limited by block size. The details are explained above.

Process 1100 may include "compute neighbor blocks for 8×8 sub-blocks by using 1 as the sub-block width or height or both for the width or height of the current block that is less than 8 pixels" 1112, and as mentioned above, the sub-blocks now use full 8×8 neighbor blocks so that 4×4 block-based MVs no longer need to be stored to reduce memory and hardware requirements as explained above.

Process 1100 may include "select neighbor blocks on at most three left columns or three rows, and one opposite row or column relative to the current block" 1114, and again, the permissible area for neighbor block is reduced from conventional areas to reduce memory and hardware needs as explained above. Another option is provided as one row and one column, but other area configurations could also be used.

Process 1100 may include "use motion vectors of located neighbor blocks to determine candidate motion vectors to be used by motion compensator to provide prediction(s) to mode selector for current block" 1116. As mentioned above, with VP9, two of the nine motion vectors on a checklist for a current block and one block that is a temporal block are chosen to be placed on the prediction list of candidate motion vectors to be provided to the motion compensator as already explained above.

Process 1100 may include repeating this part of the process for a next partition of the frame if any exists 1117, until all or multiple partitions have been analyzed, and this may be repeated for each frame in a video sequence that is to be analyzed by inter-prediction.

Process 1100 then may continue and include "determine residuals based on mode selection, generate and transmit bitstream with encoded data" 1118, including transmission of frame data, residual data, and motion vector data including the neighbor motion vectors that were selected as candidates and placed on the prediction list.

The decoder 200 then may be provided to "decode frame data, residuals, and motion vectors" 1120, which by one form, either includes pre-storing the neighbor block pattern formula at the decoder or transmitting the formula with the image data to the decoder so that the decoder can perform candidate motion vector generation from a generated neighbor block motion vector checklist. In other words, the process 1100 may repeat 1122 operations 1108 to 1117 as shown to generate the candidate motion vectors at the decoder and by using the stored neighbor block pattern formula. Accordingly, this may include using the formula to determine neighbor block locations, placing the locations on the checklist, checking the locations on the checklist to determine which locations have motion vectors, and then placing the neighbor block motion vectors on a prediction list using the order of the formula or other set order, and when a space becomes available on the prediction list as with the encoder prediction list.

The next operation then is "use motion compensation to construct prediction blocks by using the motion vectors" 1124, and "add the residuals to the prediction blocks to form reconstructed blocks" 1126. Process 1100 then may continue with "use reconstructed frames as reference frames for the motion compensation" 1128, and "repeat for multiple frames until the end of the sequence" 1130. The reconstructed frames also may be provided for display and/or storage 1132.

In general, logic units or logic modules, such as that used by encoder 300 and decoder 400 may be implemented, at least in part, by hardware, software, firmware, or any combination thereof. As shown, in some implementations, encoder and decoder 300/400 may be implemented via processor(s) 1203. In other implementations, the coders 300/400 may be implemented via hardware or software implemented via one or more other central processing unit(s). In general, coders 300/400 and/or the operations discussed herein may be enabled at a system level. Some parts, however, for enabling the motion estimation in an encoding loop, and/or otherwise controlling the type of compression scheme or compression ratio used, may be provided or adjusted at a user level, for example.

It will be appreciated that this neighbor block usage may be provided on a system that uses alternative search strategies where this strategy is only one option used, or where a group of different motion estimation processes are used and the one with the best result is ultimately used for encoding, or where the results from a number of the search processes are combined, such as a mean or median, and then the combination result is used. This may include direct methods such as block-based searches with alternative search pattern arrangements for example, and/or phase correlation, frequency domain, pixel recursive, and/or optical flow-based algorithms, and/or indirect methods such as corner detection, object tracking and other statistical function based algorithms.

While implementation of example process 500, 1000, and/or 1100 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 12, an example video coding system 1200 for providing motion estimation with a neighbor block pattern formula for video coding may be arranged in accordance with at least some implementations of the present disclosure. In the illustrated implementation, system 1200 may include one or more central processing units or processors 1203, a display device 1205, and one or more memory stores 1204. Central processing units 1203, memory store 1204, and/or display device 1205 may be capable of communication with one another, via, for example, a bus, wires, or other access. In various implementations, display device 1205 may be integrated in system 1200 or implemented separately from system 1200.

As shown in FIG. 12, and discussed above, the processing unit 1220 may have logic circuitry 1250 with an encoder 300 and/or a decoder 400. The encoder 300 may have motion estimation unit 1252 and the decoder may have motion estimation unit 1254 to read and use the formula 1208 and provide many of the functions described herein and as explained with the processes described herein.

As will be appreciated, the modules illustrated in FIG. 12 may include a variety of software and/or hardware modules and/or modules that may be implemented via software or hardware or combinations thereof. For example, the modules may be implemented as software via processing units 1220 or the modules may be implemented via a dedicated hardware portion. Furthermore, the shown memory stores 1204 may be shared memory for processing units 1220, for example, motion vector buffer 1206 and 1207 as well as the ROM formula may be stored on any of the options mentioned above, or may be stored on a combination of these options, or may be stored elsewhere. By one option, the neighbor block area MVs of the columns are stored in on-chip buffer 1206 while the one line buffer is stored in off-chip memory buffer 1207, and the ROM for storing the formula 1208 may be in either location. Also, system 1200 may be implemented in a variety of ways. For example, system 1200 (excluding display device 1205) may be implemented as a single chip or device having a graphics processor, a quad-core central processing unit, and/or a memory controller input/output (I/O) module. In other examples, system 1200 (again excluding display device 1205) may be implemented as a chipset.

Processor(s) 1203 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 1204 may hold motion vector buffer 1206, and may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1204 also may be implemented via cache memory. In various examples, system 1200 may be implemented as a chipset or as a system on a chip.

Figure 13:
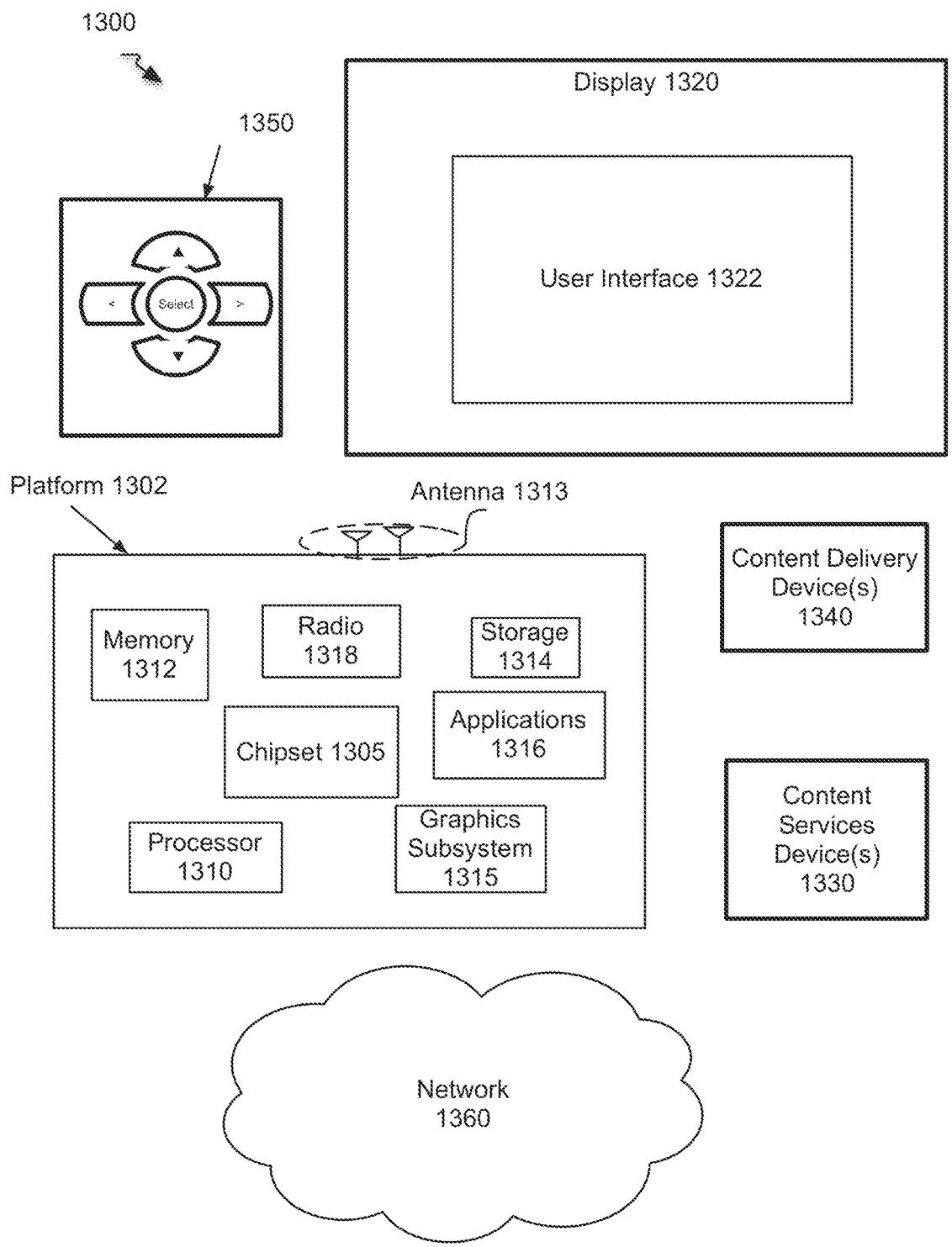
FIG. 13 is an illustrative diagram of another example system.

Referring to FIG. 13, an example system 1300 in accordance with the present disclosure and various implementations, may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1300 includes a platform 1302 communicatively coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, storage 1314, graphics subsystem 1315, applications 1316 and/or radio 1318 as well as antenna(s) 1313. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
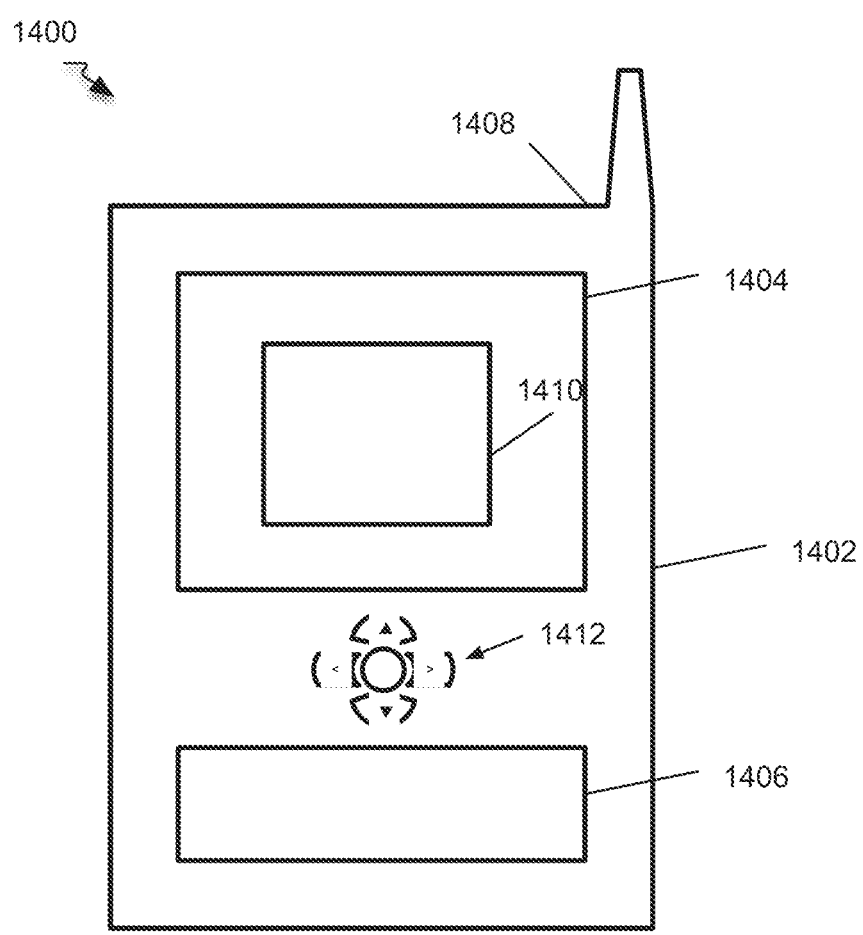
FIG. 14 illustrates another example device, all arranged in accordance with at least some implementations of the present disclosure.

As described above, system 1200 or 1300 may be implemented in varying physical styles or form factors. FIG. 14 illustrates implementations of a small form factor device 1400 in which system 1200 or 1300 may be implemented. In implementations, for example, device 1400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing 1402, a display 1404, an input/output (I/O) device 1406, and an antenna 1408. Device 1400 also may include navigation features 1412. Display 1404 may include any suitable screen 1410 on a display unit for displaying information appropriate for a mobile computing device. I/O device 1406 may include any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By one example, a computer-implemented method of motion estimation for video coding comprises receiving multiple frames of pixel data; and determining at least one motion vector candidate extending between a current block on a current frame and a reference block on a reference frame, comprising: determining spatial neighbor block locations on the same frame as the current block using a neighbor block pattern formula to compute at least one neighbor block coordinate relative to the position of the current block on the current frame and using substantially the same pattern formula regardless of the size of the current block; and using motion vectors of the neighbor blocks at locations determined by using the at least one neighbor block coordinate and to determine at least one motion vector of the current block.

By another implementation, the method may comprise using no less than 8×8 block-based motion vectors from 8×8 neighbor blocks for current blocks that have a sub-block size less than 8×8; wherein the block area permitted to have neighbor blocks comprises at least one of: a single row above and adjacent the current block, at most three columns to the immediate left of the current block, and a single row and a single column both adjacent the current block and having data stored by a single line buffer of consecutive 8×8 pixel blocks along the length of the top of the current block plus one block; the method comprising: buffering only 8×8 pixel block-based motion vectors as potential neighbor block motion vectors; determining at most nine spatial neighbor motion vectors; and determining at most two candidate motion vectors from the motion vectors to be used to determine the motion vector of the current block; wherein the neighbor block pattern formula using the width or the height or both of the current block to at least one of: determine a row or column position of at least one neighbor block, align a neighbor block at a corner of the current block, and align a neighbor block at a center of the width or height of the current block; wherein the neighbor block pattern formula is provided at a decoder to be used to determine neighbor block locations on frames at the decoder; the method comprising: storing motion vectors of at least one column of potential neighbor block area on on-chip memory while storing motion vectors of a single row of potential neighbor block area in a line buffer at other than on-chip memory; and indicating a block location is unavailable as a neighbor block to a current block when the neighbor block pattern formula places the neighbor block at a location outside and to the right of a top area extending from a 64×64 pixel superblock that contains the current block.

By yet another implementation, a computer-implemented system has a display, a memory; at least one processor communicatively coupled to the memory and display; and a motion estimation unit operated by the at least one processor and being arranged to operate by: receiving multiple frames of pixel data; and determining at least one motion vector candidate extending between a current block on a current frame and a reference block on a reference frame, comprising: determining spatial neighbor block locations on the same frame as the current block using a neighbor block pattern formula to compute at least one neighbor block coordinate relative to the current block and using substantially the same pattern formula regardless of the size of the current block; and using motion vectors of the neighbor blocks at determined neighbor block locations to determine at least one motion vector of the current block.

By another implementation, the system includes wherein the neighbor block pattern formula uses the width or the height or both of the current block to determine a row or column position of at least one neighbor block; wherein the motion estimation unit is operated by using no less than 8×8 block-based motion vectors from 8×8 pixel neighbor blocks for current blocks that are a sub-block size less than 8×8 pixel; wherein the block area permitted to have neighbor blocks comprises one of: a single row above the current block with motion vectors stored off-chip, and at most three columns to the immediate left of the current block with motion vectors stored on-chip, and a single row and a single column both adjacent the current block; wherein eight neighbor blocks each are used for current block of 8×16 or 16×8 pixel, and wherein at most nine neighbor blocks are used for other current block sizes due, at least in part, to the neighbor block pattern formula; wherein neighbor blocks are eliminated due to duplication so that less than nine neighbor blocks listed by the neighbor block pattern formula are provided for current blocks of different sizes and due, at least in part, to equations provided by the neighbor block pattern formula; and wherein the neighbor block locations are determined without using a look-up table that lists fixed neighbor block locations depending on current block size.

By one approach, at least one computer readable medium having stored thereon instructions that when executed cause a computing device to operate by: receiving multiple frames of pixel data; and determining at least one motion vector candidate extending between a current block on a current frame and a reference block on a reference frame, comprising: determining spatial neighbor block locations on the same frame as the current block using a neighbor block pattern formula to compute at least one neighbor block coordinate relative to the current block and using substantially the same pattern formula regardless of the size of the current block; and using motion vectors of the neighbor blocks at determined neighbor block locations to determine at least one motion vector of the current block.

The instructions cause the computing device to operate by: using no less than 8×8 block-based motion vectors from 8×8 neighbor blocks for current blocks that have a sub-block size less than 8×8; wherein the block area permitted to have neighbor blocks comprises at least one of: a single row above and adjacent the current block, at most three columns to the immediate left of the current block, and a single row and a single column both adjacent the current block and having data stored by a single line buffer of consecutive 8×8 pixel blocks along the length of the top of the current block plus one block; wherein the instructions cause the computing device to operate by: buffering only 8×8 pixel block-based motion vectors as potential neighbor block motion vectors; determining at most nine spatial neighbor motion vectors; and determining at most two candidate motion vectors from the motion vectors to be used to determine the motion vector of the current block; wherein the neighbor block pattern formula using the width or the height or both of the current block formula to at least one of: determine a row or column position of at least one neighbor block, align a neighbor block at a corner of the current block, and align a neighbor block at a center of the width or height of the current block; wherein the neighbor block pattern formula is provided at a decoder to be used to determine neighbor block locations on frames at the decoder; wherein the instructions cause the computing device to operate by: storing motion vectors of at least one column of potential neighbor block area on on-chip memory while storing motion vectors of a single row of potential neighbor block area in a line buffer at other than on-chip memory; and indicating a block location is unavailable as a neighbor block to a current block when the neighbor block pattern formula places the neighbor block at a location outside and to the right of a top area extending from a 64×64 pixel superblock that contains the current block.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of motion estimation for video coding comprising:
   receiving, by at least one processor, multiple frames of pixel data; and
   determining, by at least one processor, at least one motion vector candidate extending between a current block on a current frame and a reference block on a reference frame, wherein the current block is alternatively provided in one of a variety of available sizes, the determining comprising:
      determining spatial neighbor block locations on the same frame as the current block and including at least one spatial neighbor block adjacent the current block, wherein spatial neighbor blocks at the locations have a same single fixed size, wherein the current block is not limited to being the same size as the spatial neighbor blocks, and using a neighbor block pattern formula to compute at least one neighbor block coordinate relative to the position of the current block on the current frame and using substantially the same pattern formula regardless of the size of the current block relative to the neighbor blocks; and
      using motion vectors of the neighbor blocks at locations determined by using the at least one neighbor block coordinate and to determine at least one motion vector of the current block.

2. The method of claim 1 comprising:
   using no less than 8×8 block-based motion vectors from 8×8 neighbor blocks for current blocks that have a sub-block size less than 8×8.

3. The method of claim 1 wherein the block area permitted to have neighbor blocks comprises a single row above and adjacent the current block.

4. The method of claim 3 wherein the block area permitted to have neighbor blocks at most three columns to the immediate left of the current block.

5. The method of claim 1 wherein the block area permitted to have neighbor blocks comprises a single row and a single column both adjacent the current block and having data stored by a single line buffer of consecutive 8×8 pixel blocks along the length of the top of the current block plus one block.

6. The method of claim 1 comprising buffering only 8×8 pixel block-based motion vectors as potential neighbor block motion vectors.

7. The method of claim 1 comprising determining at most nine spatial neighbor motion vectors; and determining at most two candidate motion vectors from the motion vectors to be used to determine the motion vector of the current block.

8. The method of claim 1 wherein the neighbor block pattern formula using the width or the height or both of the current block to at least one of:
   determine a row or column position of at least one neighbor block,
   align a neighbor block at a corner of the current block, and
   align a neighbor block at a center of the width or height of the current block.

9. The method of claim 1 wherein the neighbor block pattern formula is provided at a decoder to be used to determine neighbor block locations on frames at the decoder.

10. The method of claim 1 comprising storing motion vectors of 1 to 3 columns of potential neighbor block area on on-chip memory while storing motion vectors of a single row of potential neighbor block area in a line buffer at other than on-chip memory.

11. The method of claim 1 comprising indicating a block location is unavailable as a neighbor block to a current block when the neighbor block pattern formula places the neighbor block at a location outside and to the right of a top area extending from a 64×64 pixel superblock that contains the current block.

12. A computer-implemented system comprising:
   a display;
   a memory;
   at least one processor communicatively coupled to the memory and display;
   the at least one processor being arranged to operate by:
      receiving multiple frames of pixel data; and
      determining at least one motion vector candidate extending between a current block on a current frame and a reference block on a reference frame, wherein the current block is alternatively provided in one of a variety of available sizes, the determining comprising:
         determining spatial neighbor block locations on the same frame as the current block and including at least one spatial neighbor block adjacent the current block, wherein spatial neighbor blocks at the locations have a same single fixed size, wherein the current block is not limited to being the same size as the spatial neighbor blocks, and using a neighbor block pattern formula to compute at least one neighbor block coordinate relative to the current block and using substantially the same pattern formula regardless of the size of the current block relative to the neighbor blocks; and
         using motion vectors of the neighbor blocks at determined neighbor block locations to determine at least one motion vector of the current block.

13. The system of claim 12 wherein the neighbor block pattern formula uses the width or the height or both of the current block to determine a row or column position of at least one neighbor block.

14. The system of claim 12 wherein the motion estimation unit is operated by using no less than 8×8 block-based motion vectors from 8×8 pixel neighbor blocks for current blocks that are a sub-block size less than 8×8 pixel.

15. The system of claim 12 wherein the block area permitted to have neighbor blocks comprises a single row above the current block with motion vectors stored off-chip, and at most three columns to the immediate left of the current block with motion vectors stored on-chip.

16. The system of claim 12 wherein the block area permitted to have neighbor blocks comprises a single row and a single column both adjacent the current block.

17. The system of claim 12 wherein eight neighbor blocks each are used for current block of 8×16 or 16×8 pixel, and wherein at most nine neighbor blocks are used for other current block sizes due, at least in part, to the neighbor block pattern formula.

18. The system of claim 12 wherein neighbor blocks are eliminated due to duplication so that less than nine neighbor blocks listed by the neighbor block pattern formula are provided for current blocks of different sizes and due, at least in part, to equations provided by the neighbor block pattern formula.

19. The system of claim 12 wherein the neighbor block locations are determined without using a look-up table that lists fixed neighbor block locations depending on current block size.

20. The method of claim 1 wherein the neighbor block pattern formula is provided at a decoder to be used to determine neighbor block locations on frames at the decoder.

21. The system of claim 12 wherein the neighbor block pattern formula uses the width or the height or both of the current block formula to at least one of:
- determine a row or column position of at least one neighbor block,
- align a neighbor block at a corner of the current block, and
- align a neighbor block at a center of the width or height of the current block.

22. A non-transitory computer-readable medium having stored thereon instructions that when executed cause a computing device to operate by:
- receiving multiple frames of pixel data; and
- determining at least one motion vector candidate extending between a current block on a current frame and a reference block on a reference frame, wherein the current block is alternatively provided in one of a variety of available sizes, the determining comprising:
  - determining spatial neighbor block locations on the same frame as the current block, and including at least one spatial neighbor block adjacent the current block, wherein spatial neighbor blocks at the locations have a same single fixed size, wherein the current block is not limited to being the same size as the spatial neighbor blocks, and using a neighbor block pattern formula to compute at least one neighbor block coordinate relative to the current block and using substantially the same pattern formula regardless of the size of the current block relative to the neighbor blocks; and
  - using motion vectors of the neighbor blocks at determined neighbor block locations to determine at least one motion vector of the current block.

23. The method of claim 1 wherein the formula uses positions of the neighbor blocks relative to one or more corners or proportional position along one or more sides of the current block.

24. The system of claim 12 wherein the formula uses positions of the neighbor blocks relative to one or more corners or proportional position along one or more sides of the current block.

25. The medium of claim 22 wherein the formula uses positions of the neighbor blocks relative to one or more corners or proportional position along one or more sides of the current block.

* * * * *